United States Patent [19]
Dai et al.

[11] Patent Number: 5,439,402
[45] Date of Patent: Aug. 8, 1995

[54] DESIGN OF AN INTEGRATED INLET DUCT FOR EFFICIENT FLUID TRANSMISSION

[75] Inventors: Charles M. Dai, Potomac; Christopher J. Kerr, Germantown, both of Md.; Phuc N. Nguyen, Lorton; Han-Ch'ing Wang, Vienna, both of Va.

[73] Assignee: The United States of America as represented by the Secretary of the Navy, Washington, D.C.

[21] Appl. No.: 314,278

[22] Filed: Sep. 30, 1994

[51] Int. Cl.⁶ .................................. B63H 11/103
[52] U.S. Cl. .................................... 440/47
[58] Field of Search ............ 440/38, 39, 40, 41, 440/42, 43, 47; 60/200.1, 221, 222

[56] References Cited

U.S. PATENT DOCUMENTS

| | | | |
|---|---|---|---|
| 3,840,319 | 10/1974 | Rhoda | 440/38 |
| 4,276,035 | 6/1981 | Kobayashi | 440/38 |
| 5,289,793 | 3/1994 | Aker | 440/38 |

*Primary Examiner*—Stephen Avila
*Attorney, Agent, or Firm*—Gary G. Borda

[57] ABSTRACT

The invention is directed to a method for designing a fluid inlet duct for a marine vehicle hull, generally comprises the steps of: (a) determining an inlet duct surface geometry, represented by a series of fifth-order Bezier cross-link curves, within specified hydrodynamic design constraints; (b) generating a panel representation of the surface geometry; (c) calculating the pressure and velocity distributions of the flow within the inlet duct; (d) evaluating the surface geometry; (e) repeating steps (a)-(d) for subsequent iterations of the surface geometry until the specified hydrodynamic design constraints are satisfactorily met at a predetermined design condition; (f) evaluating a resulting surface geometry at off-design conditions; (g) repeating step (a)-(d) for subsequent iterations of the surface geometry until the specified hydrodynamic design constraints are satisfactorily met at off-design conditions; (h) performing a geometric refinement to a fillet region of high curvature in the inlet duct; (i) generating a panel representation of a resulting surface geometry; (j) calculating the pressure and velocity distributions of the flow within the inlet duct; (k) evaluating the surface geometry at desired operating conditions; and (l) repeating steps (h)-(k) for subsequent iterations of the surface geometry until the specified hydrodynamic design constraints are optimally met.

16 Claims, 13 Drawing Sheets

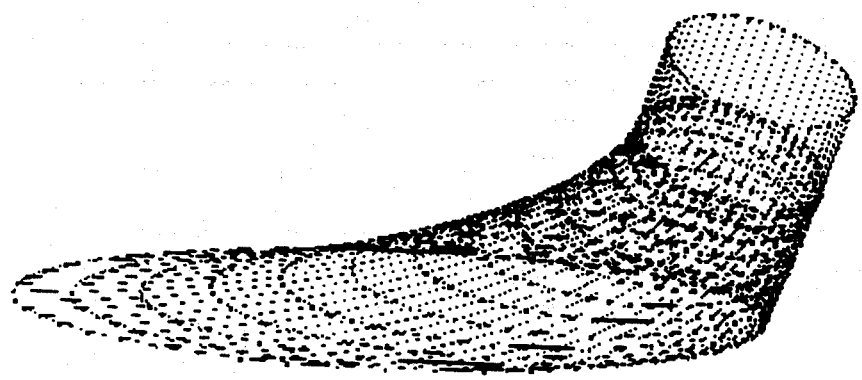
FIG. 13
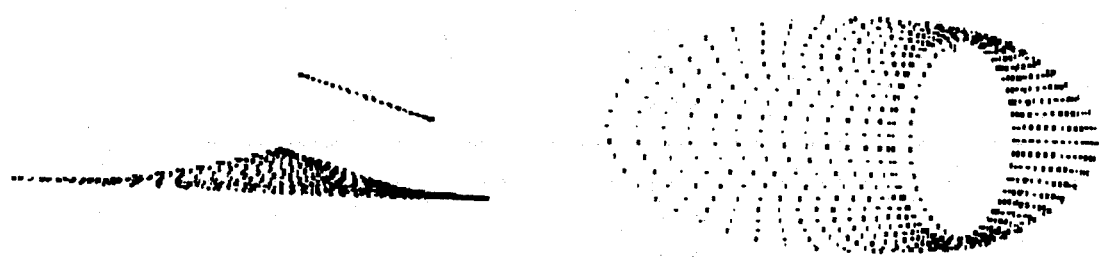
FIG. 14A
FIG. 14B

DESIGN OF AN INTEGRATED INLET DUCT FOR EFFICIENT FLUID TRANSMISSION

STATEMENT OF GOVERNMENT RIGHTS

The invention described herein may be manufactured and used by or for the Government of the United States of America for governmental purposes without the payment of any royalties thereon or therefor.

BACKGROUND OF THE INVENTION

1. Field of Invention

The present invention relates generally to the design and fabrication of flush inlets for marine or aeronautical applications and, more particularly, to a hydrodynamically designed, integrated inlet duct having a short length and a steep duct inclination angle and which provides efficient and cavitation free transmission of a fluid therethrough.

2. Brief Description of Related Art

Flush inlets have been used in both nautical and aeronautical applications. Nautical applications have included inlets for water jet propulsion systems for high speed marine vehicles. Aeronautical applications have included air inlet for engines of high speed aircraft.

Theoretically, the optimum inlet should be designed to match the flow at the vehicle design speed and power. At this condition, the inlet has the optimum inlet velocity ratio and is entirely free from cavitation. Strictly, all other conditions require a different inlet area to maintain the optimum inlet velocity ratio and energy recovery. Past water jet propulsion systems have attempted to provide improved propulsive and cavitation performance over wider speed ranges by using such devices as variable geometry inlets. However, these mechanically complicated schemes add weight and cost to the system.

The design of an optimum inlet for a given application should include model testing and iterative adjustments of geometry guided by the designer's experience and theoretical knowledge. However, this is economical only in large projects. Usually, except in very large projects, a standard inlet geometry, which has been found to give acceptable performance, is used. If designed for a particular application, prior art inlets have optimum efficiency at a particular design condition (i.e., a particular design speed and power). However, efficiency drops off rapidly at off design conditions. The inlet geometry, if optimized at all, is designed to match the flow at the vehicle design condition. Consequently, flush or semi-flush inlets have generally had ramp-angles (duct inclination angles) that are less than about 30° relative to a substantially horizontal inlet plane. These shallow-ramp-angle inlets generally include a long radius of curvature leading edge lip (upstream transition from hull surface to inlet duct) resulting in duct lengths, from inlet to pump impeller, that are quite long. Consequently, viscous losses in the duct are high. Furthermore, at low ship speeds, flow separation at the inlet may occur due to pump suction induced flow angles that are high relative to the shallow-ramp-angle.

A further disadvantage of present inlet designs is the method of designing and locating the inlet with respect to the body in which the inlet is mounted. Inlet ducts operate under very complex three-dimensional flow conditions. Consequently, efficiency and cavitation performance of water jets is very dependent on a good design of the water inlet. However, prior inlet design methods have been restricted to considering simple two-dimensional momentum theory and two-dimensional flow regimes. As a result, the design and locating of water jet inlets has been generally confined to considering symmetric flow. Moreover, present inlet design methods have not provided a method in which design modifications can be readily accomplished within an iterative design process.

Consequently, there is a need for an iterative inlet design method that offers a simple means of modifying the inlet design and evaluating the effects of the modifications within the iterative process. There is a further need for a simple design method that produces an inlet duct design having high efficiency and good cavitation performance at both low speeds and high speeds. There is a further need for a system that offers flexibility of placement while minimizing the various losses associated with the inlet.

OBJECTS OF THE INVENTION

Accordingly, it is an object of the present invention to provide a simple, economic inlet design methodology for producing water jet propulsion system inlets having high efficiency over a wide speed range.

It is a further object of the present invention to provide an integrated hull and inlet design method that minimizes cavitation, internal ventilation, and inlet and duct losses.

It is still a further object of the present invention to provide an integrated hull and inlet design having improved cavitation and flow separation characteristics and that can be produced based on the design method using standard fabrication techniques.

Other objects and advantages of the present invention will become apparent to those skilled in the art upon a reading of the following detailed description taken in conjunction with the drawings and the claims supported thereby.

SUMMARY OF THE INVENTION

In accordance with the present invention, a method for designing a short, steep, integrated inlet duct for efficient fluid transmission of a substantially cavitation free flow is provided. According to one embodiment of the present invention, the design method includes the following steps:

(a) determine a surface geometry for an integrated inlet duct within specified hydrodynamic design constraints, the inlet duct having an inlet opening defining an inlet plane, an inlet exit defining an exit plane, a centrally located reference axis extending from the inlet plane to the exit plane, and a smooth continuous surface extending from a periphery of said inlet opening to a periphery of said inlet exit, the surface geometry is represented by a series of fifth-order Bezier cross-link curves, each Bezier cross-link curves is explicitly and uniquely defined by a set of five associated control points the five associated control points being the independent variables of the Bezier basis function, wherein a series of the sets defines the surface geometry;

(b) generating a panel representation of the surface geometry, the panel representation representing an internal surface of the inlet duct, wherein the surface establishes the pressure and velocity distributions of the flow within the inlet duct;

(c) calculating the pressure and velocity distributions of the flow within the inlet duct, the pressure and velocity distributions including the effect of a predetermined suction;

(d) evaluating the surface geometry based on the specified hydrodynamic design constraints;

(e) repeating steps (a) through (d) for subsequent iterations of the surface geometry until the specified hydrodynamic design constraints are satisfactorily met at a predetermined design condition;

(f) evaluating the resulting surface geometry at off-design conditions; and (g) repeating step (a) through (d) for subsequent iterations of the surface geometry until the specified hydrodynamic design constraints are satisfactorily met at off-design conditions.

According to another embodiment of the present invention, the design method further includes the steps of:

(h) performing a geometric refinement to a fillet region, the fillet region defining a region of high curvature adjacent the inlet opening of the inlet duct;

(i) generating a panel representation of the resulting surface geometry;

(j) calculating the pressure and velocity distributions of the flow within the inlet duct, the pressure and velocity distributions including the effect of a predetermined suction;

(k) evaluating the surface geometry based on the specified hydrodynamic design constraints, the evaluation being performed at desired operating conditions; and (l) repeating steps (h) through (k) for subsequent iterations of the surface geometry until the specified hydrodynamic design constraints are optimally met.

According to a further aspect of the present invention, a resulting inlet duct extends axially between an initial end, which circumscribes an inlet opening and defines an inlet plane, and a terminal end, which circumscribes an inlet exit and defines an exit plane. The duct has a centrally located reference axis extending from the inlet plane to the exit plane. The reference axis defines an inlet duct inclination angle of between about 45° and about 75° relative to the inlet plane. The exit plane is perpendicular to the reference axis. The length of the inlet duct from the inlet opening to the inlet exit is less than or equal to about the diameter of the inlet exit. The shape of inlet duct and of the hull surface adjacent the inlet opening are designed together, using the design methodology of the present invention, to provide improved hydrodynamic characteristics.

The inlet opening is curvilinear in shape, i.e., has a curvilinear cross-section at the inlet plane. The inlet exit is circular in shape, i.e., has a circular cross-section at the exit plane, and is arranged concentrically with the reference axis. Moreover, the internal shape of the inlet duct is a Bezier surface, wherein the Bezier surface is defined by a series of fifth order Bezier cross-link curves.

BRIEF DESCRIPTION OF THE DRAWINGS

The foregoing objects and other advantages of the present invention will be more fully understood by reference to the following description taken in conjunction with the accompanying drawings wherein like reference numerals refer to like or corresponding element throughout and wherein:

FIG. 3b. is a flow diagrams of the Inlet Geometric Design Module of FIG. 3a.

FIG. 13. depicts the effect of bias1 of the Inlet Geometric Design Module of the present invention.

FIGS. 14a. and 14b. depict the effect of bias2 of the Inlet Geometric Design Module of the present invention.

DETAILED DESCRIPTION OF THE PREFERRED EMBODIMENT

Figure 1:
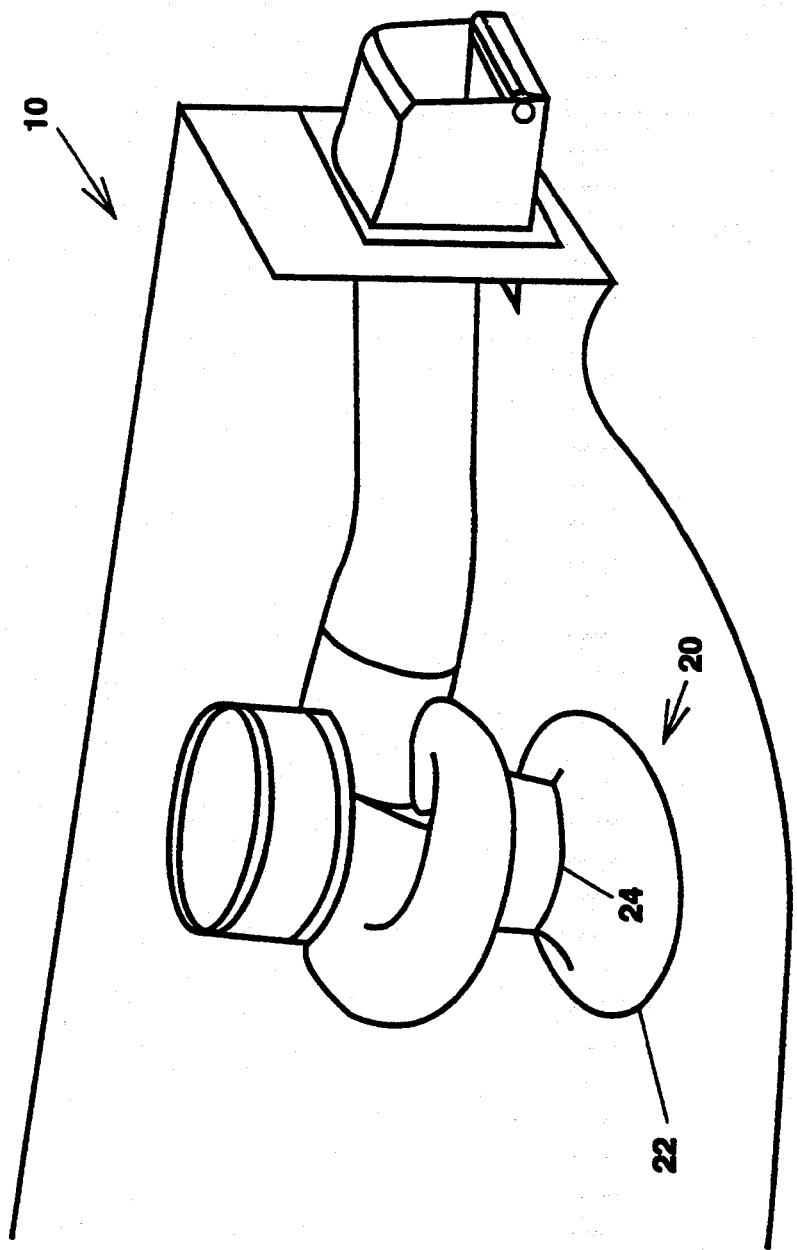
FIG. 1 is a perspective view showing the inlet duct of the present invention mounted in a marine vehicle relative to a water jet propulsion system.
Figure 2:
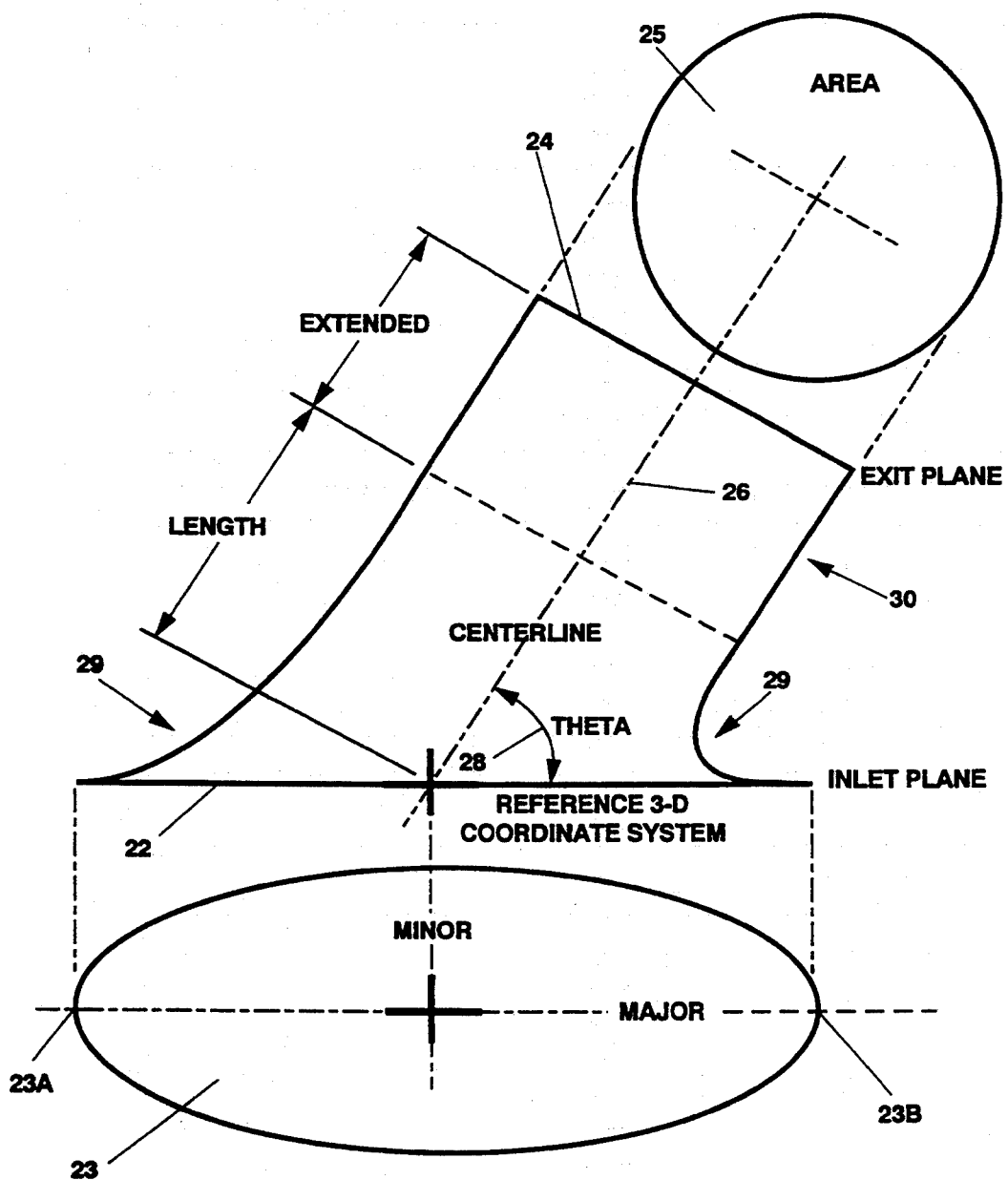
FIG 2. is an exploded diagrammatic view of the inlet of the present invention.

Referring now to the drawings, and particularly to FIGS. 1 and 2, integrated inlet duct 20 as designed by the method of the present invention is shown. Integrated inlet duct 20 is shown mounted in marine vehicle 10. The outlines of marine vehicle 10 indicate how integrated inlet duct 20 is located and oriented in the aft portion of marine vehicle 10. Integrated inlet duct 20 extends between initial end 22, which circumscribes inlet opening 23 and defines the inlet plane of integrated inlet duct 20, and terminal end 24, which circumscribes inlet exit 25 and defines the exit plane of integrated inlet duct 20. Inlet opening 23 is curvilinear in shape, i.e., has a curvilinear transverse cross-section at the inlet plane that extends from leading edge 23a to trailing edge 23b. The curvilinear transverse cross-section is preferably chosen from the group consisting of a circle, an ellipse and an oval. Centrally located reference axis 26 of integrated inlet duct 20 extends from the inlet plane to the exit plane. Reference axis 26 of integrated inlet duct 20 is perpendicular to the exit plane. Inlet exit 25 is circular in shape, i.e., has a circular transverse cross-section at the exit plane, and is arranged concentrically with reference axis 26. Centrally located reference axis 26 defines inclination angle 28. Inclination angle 28 is the angle between reference axis 26 and the inlet plane. Inclination angle 28 is a steep angle, preferably being between about 45° and about 75°. Compared to prior art shallow-ramp-angle inlet ducts for water jet propulsion systems, integrated inlet duct 20 is short in length from inlet plane to exit plane. In the specification and claims, the term "short" when used to refer to a preferred embodiment of integrated inlet duct 20 is intended to indicate that the length of integrated inlet duct 20 from inlet opening 23 to inlet exit 25 is less than or equal to about the diameter of inlet exit 25.

Integrated inlet duct 20 at initial end 22 is adapted to be mounted flush with the surface of marine vehicle 10. That is, no part of integrated inlet duct 20 protrudes beyond the surrounding surface of marine vehicle 10. The design method of the present invention ensures that the inlet, adjacent inlet opening 23, is tangent to the surrounding hull surface. Thus, peripheral lip or fillet 29 of integrated inlet duct 20 adjacent inlet opening 23 is hydrodynamically shaped to form a smooth, separation free transition between the surface of marine vehicle 10 and the upstream portion of integrated inlet duct 20 (i.e., that portion of inlet duct 20 adjacent to and immediately downstream of inlet exit 25). Fillet 29 is defined as a region of high curvature relative to remaining portions of integrated inlet duct 20. The curvature in this region need not be constant around the circumference of inlet duct 20 and, as shown in FIG. 2, generally is a more gradual curve adjacent leading edge 23a than adjacent trailing edge 23b. Fillet 29 is generally located adjacent inlet opening 23. The internal surface of integrated inlet duct 20 defines the shape of the flow passage from inlet opening 23 to inlet exit 25 wherein the internal surface of integrated inlet duct 20 is a Bezier surface. The Bezier surface is defined by a series of fifth order Bezier cross-link curves as determined by the instant design methodology. Additionally, a cylindrical duct extension 30, defined by the area of inlet exit 25, may be attached to integrated inlet duct 20 at terminal end 24 to form an extended duct.

Inlet performance is critical to the energy efficiency of water jet propulsion systems. Water jet propulsion system inlets operate in very complex three-dimensional flow regimes that present potential cavitation, ventilation, and energy loss problems. Water jet efficiency is influenced by inlet system drag and internal losses. In addition, pump cavitation is highly dependent on inlet duct energy recovery and velocity distribution at the outlet plane (exit plane) of the inlet duct. To design an inlet duct that fully addresses these problems and which allows for flexible placement of the inlet opening at either symmetric or non-symmetric hull surface locations, an unconstrained three-dimensional flow regime must be considered in designing the inlet duct geometry. Moreover, the affect of the inlet and pump suction on the wake field into the inlet must be considered and negative affects minimized.

Figure 3A:
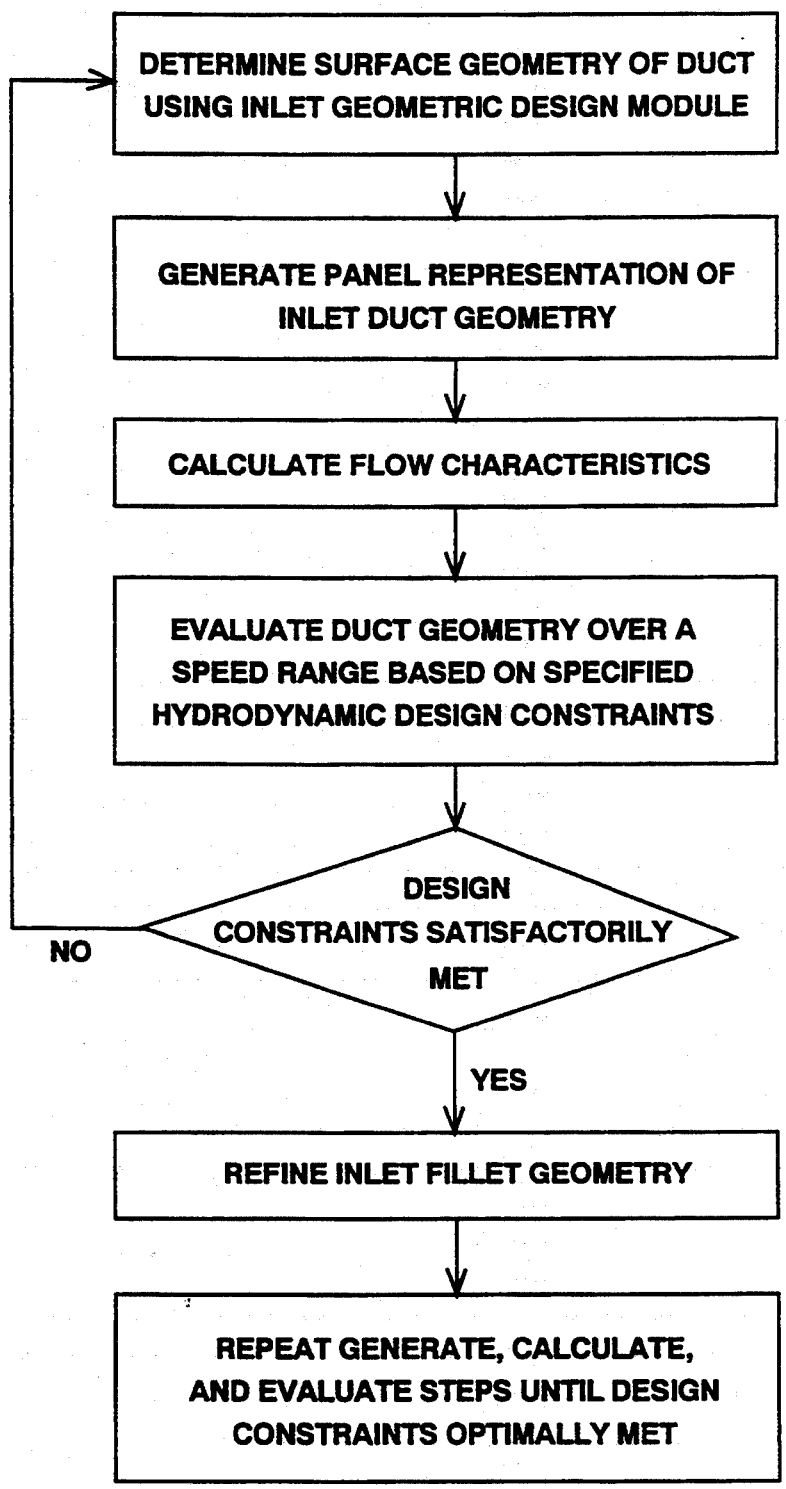
FIG. 3a. is a flow diagrams of the Iterative Design and Analysis Method of the present invention.
Figure 3B:
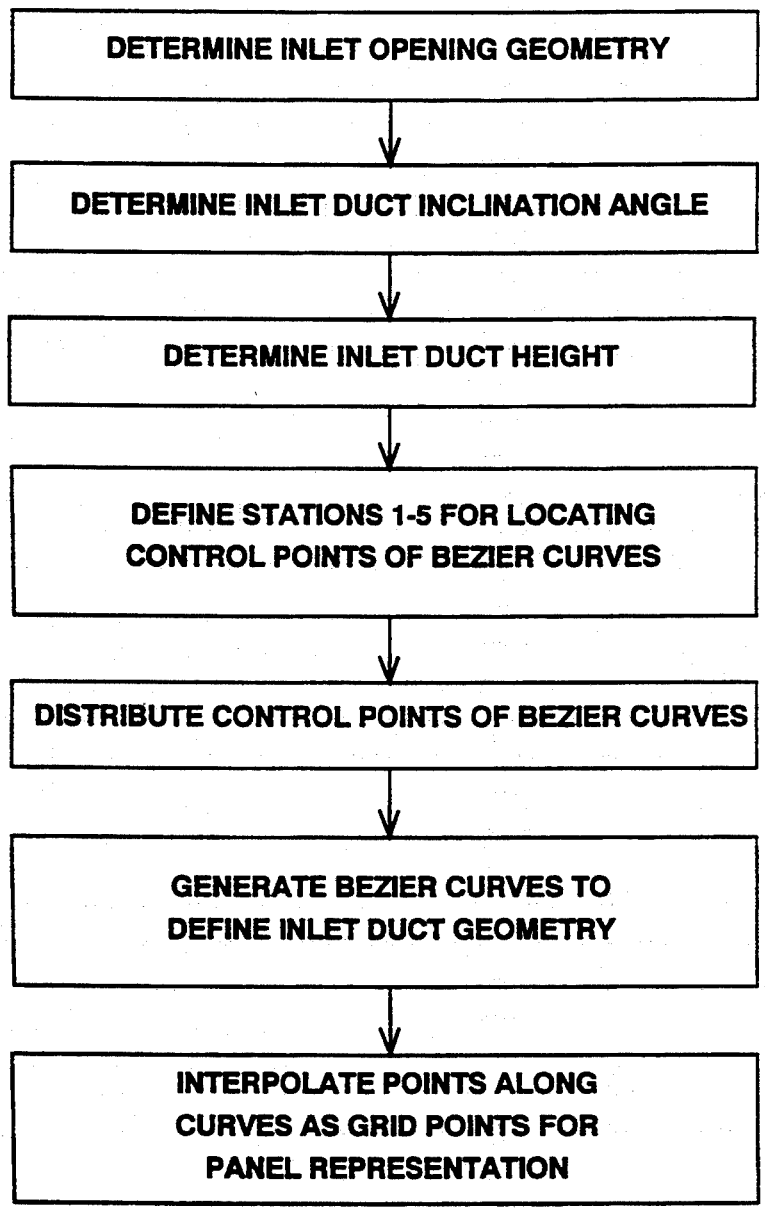

Therefore, in accordance with the design methodology of the present invention, the inlet duct and adjacent portions of the hull surface are designed together as one integrated hydrodynamic unit. The design method results in an integrated inlet duct that provides superior overall propulsive efficiency over the operating speed range, without inducing cavitation or flow separation and without increasing vehicle resistance. In order to provide these results, the present method for designing an integrated inlet duct for providing efficient transmission of a substantially cavitation free fluid flow employs an iterative process, as illustrated in FIGS. 3a and 3b, that minimizes thrust deduction fraction and, thus, increases hull efficiency and ultimately overall propulsive efficiency. Moreover, to prevent cavitation, minimum pressure in integrated inlet duct 20 should remain above the water's vapor pressure. Lastly, pressure gradients in integrated inlet duct 20 and over the adjacent portions of marine vehicle 10 should not be so severe as to induce flow separation.

In the specification and claims, the term "integrated inlet duct," when referring to integrated inlet duct 20, is intended to indicate an inlet duct having an internal surface geometry that possesses the favorable flow characteristics described herein, is restricted by the geometric parameters and hydrodynamic constraints described herein, and is ascertained by the design methodology of the present invention.

The design of integrated inlet duct 20 having positive pressure characteristics and low thrust deduction fraction over the operating speed range requires evaluating inlet flow at both design and off-design speeds. This is a multi-point design problem requiring close coupling between hydrodynamic design and geometric design of the inlet duct and adjacent hull surface. Inlet duct geometry is optimized through a multi-variant optimization technique. The design process is an iterative process that employs software to generate the inlet duct surface geometry (a listing of which is attached hereto and which is described hereinafter) linked to well-known panel method software to model the hull and inlet duct and to determine the flow characteristics, i.e., velocity distributions, pressures, and resulting forces and thrust deduction fraction. The numerical determination of these flow characteristics is well known to Naval Architects and Hydrodynamicists of ordinary skill and will not be described herein.

The particular panel method program used is not essential and is not intended as a limitation on the present invention. Examples of such numerical programs include VSAERO and MIT PSF 10 software codes. These programs, which employ panel methods to model the hull and inlet duct and incompressible potential flow theory to compute pressures and velocity distributions, are well known in the art and will not be described in detail here. VSAERO is available from Analytical Methods, Inc. of Redmond, Wash. 98052, and is described in an AMI Report entitled "PROGRAM 'VSAERO' A Computer Program for Calculating the Non-linear Aerodynamic Characteristics of Arbitrary Configurations," prepared by B. Maskew under Contract NAS2-11945 for NASA Ames Research Center (December 1984). MIT PSF 10, available from the Massachusetts Institute of Technology, is described in Massachusetts Institute of Technology Doctoral dissertation entitled, "Development and Analysis of Panel Methods for Propeller Unsteady Flow," by Ching-Yeh Hsin (1990). An example of a preprocessor for the above programs is the AGPS software code commercially available from Boeing. AGPS provides panel grid points (corner points of the panels) for input into the above programs.

Desired flow characteristics of integrated inlet duct 20 include: substantially uniform flow (uniform pressure, velocity, and direction of flow) at the inlet exit over a wide speed range; minimum energy losses in the duct; no flow separation during operation; and no surface cavitation. Based on these characteristics, the following hydrodynamic design constraints are imposed on the geometric design of integrated inlet duct 20: optimize pressure on inlet duct and adjacent hull surfaces to minimize thrust deduction fraction (good pressure recovery aft of the inlet duct is required for minimum thrust deduction); require minimum absolute pressure at any point on the inlet duct surface to remain above the vapor pressure of the water; and minimize pressure gradients in axial and circumferential directions inside the duct. Furthermore, the following geometric design parameters are imposed on the design: the internal contour of integrated inlet duct 20 is a Bezier surface; the shape of inlet exit 25 is a circle; the length of integrated inlet duct 20 should be as short as possible to minimize viscous losses, and preferably it should be less than or equal to the diameter of inlet exit 25; and inlet duct inclination angle 28 should be as steep as possible, and in no case less than 45° relative to the inlet plane. By providing an integrated inlet duct geometry comprising a uniquely defined Bezier surface that meets the above listed hydrodynamic and geometric design constraints, integrated inlet duct 20 of the present invention possess the above listed flow characteristics while providing good propulsive efficiency at the design speed and improved propulsive efficiency at off-design speeds.

Figure 4:
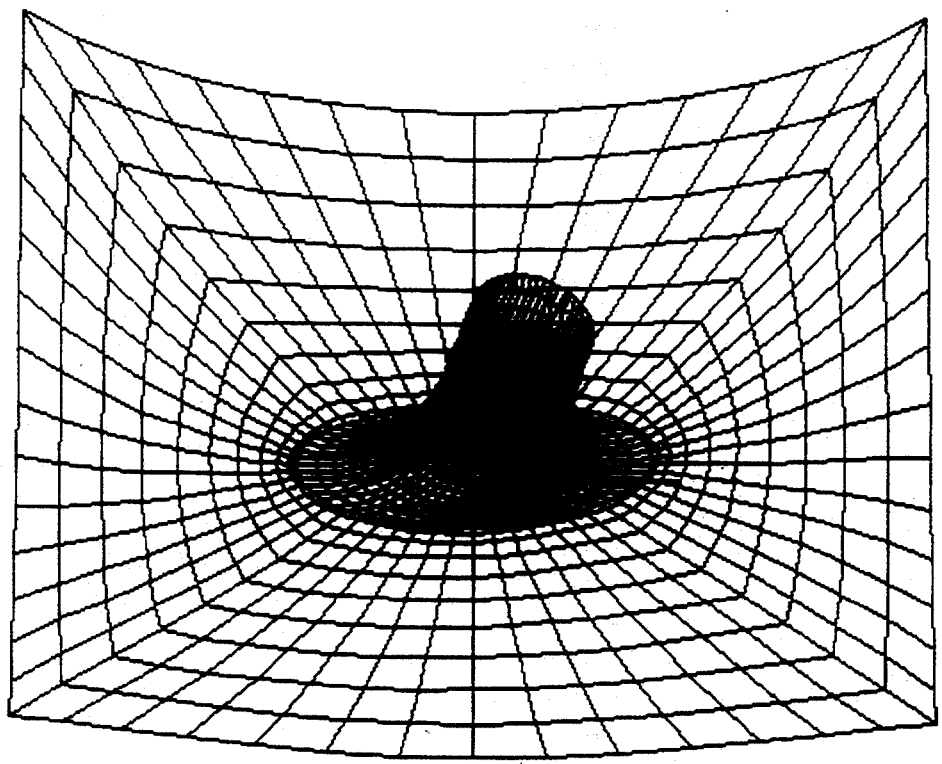
FIG. 4. is a panel representation of the inlet and hull patch as produced by the present invention.
Figure 8:
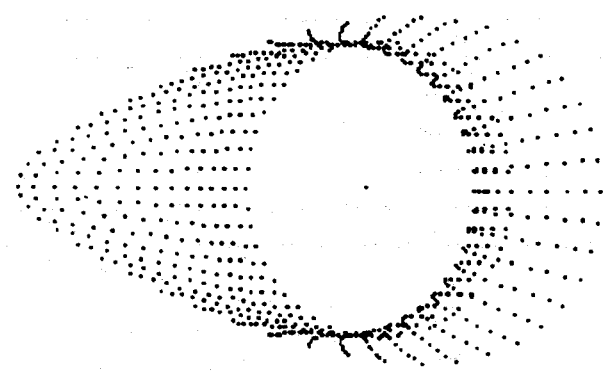
FIG. 8. depicts the effect of sqash of the Inlet Geometric Design Module of the present invention.
Figure 5A:
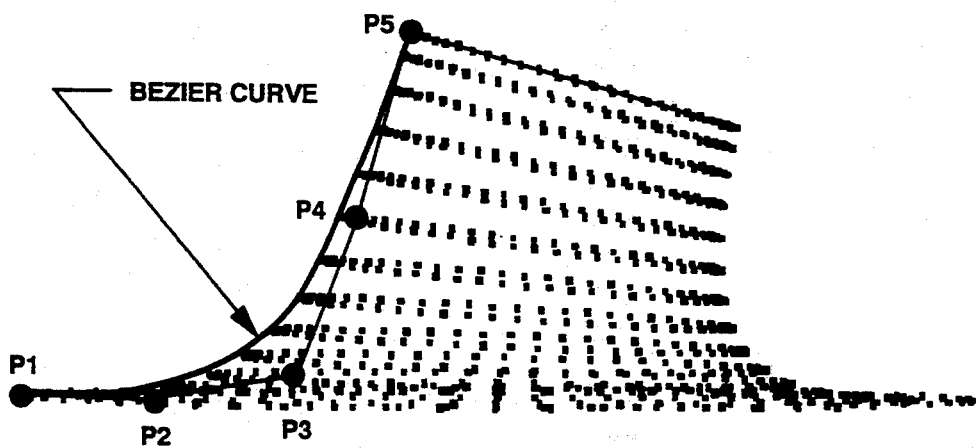
FIGS. 5a. and 5b. are representations of the inlet duct of the present invention showing an exemplary Bezier curve, control points of the Bezier curve and interpolated points on a family of curves.
Figure 5B:
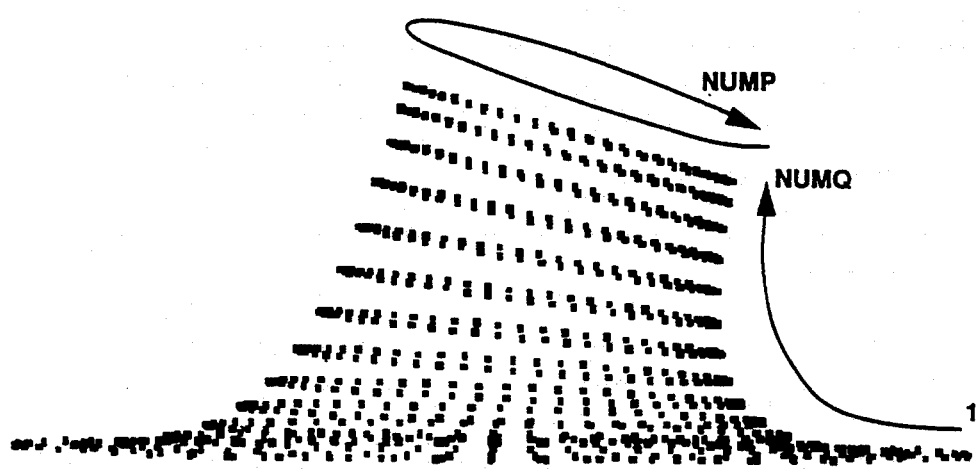

The iterative design procedure for optimizing the geometry of integrated inlet duct 20 is based on optimizing the pressure on the surface of the duct and adjacent hull. The internal surface geometry of integrated inlet duct 20 determines the pressures in the inlet duct. Thus, optimizing the duct design involves iteration between duct geometry and resulting pressures to meet design constraints. The iterative design procedure includes the following steps:

1. generate a panel representation of marine vehicle 10 in the barehull configuration (without integrated inlet duct 20) and analyze flow over the barehull over the desired speed range to determine a location for inlet opening 23 based on favorable flow characteristics (flow direction and pressure);

2. determine an internal surface geometry for integrated inlet duct 20 within specified geometric and hydrodynamic design constraints, the surface being represented by a series of fifth order Bezier cross-link curves (more fully described below);

3. generate a panel representation of integrated inlet duct 20, the surface of which is defined by the series of Bezier curves determined during step 2, and an adjacent patch of marine vehicle 10 (as shown in an exemplary representation in FIG. 4);

4. calculate pressure and velocity distributions of flow over the patch of marine vehicle 10 and within integrated inlet duct 20 with pump suction effect included (the modeling of pump suction by a patch of sinks located at the exit plane of integrated inlet duct 20 is well know and will not be described in detail herein);

5. evaluate the duct geometry based on positive pressure characteristics and a low thrust deduction fraction as detailed in the design constraints listed above (assume trim remains constant);

6. repeat steps 2 through 5 for subsequent iterations of inlet duct geometry until the specified design constraints are satisfactorily met at a predetermined design condition (the hydrodynamic design constraints may not be identically met, therefore, the geometry that optimizes the flow characteristics, based on the specified hydrodynamic constraints as a goal, is chosen);

7. evaluate the resulting inlet duct geometry at off-design conditions;

8. repeat steps 2 through 5 for geometric refinement of inlet duct geometry until design constraints are satisfactorily met at off-design conditions;

9. perform local refinement of fillet geometry to optimize absolute pressure and pressure gradients in the area of high curvature adjacent inlet opening 23 (more fully described below);

10. generate a panel representation of inlet duct, including local refinement of inlet fillet geometry, and an adjacent patch of marine vehicle 10;

11. calculate pressure and velocity distributions of flow over the patch of marine vehicle 10 and within integrated inlet duct 20 with pump suction effect included;

12. evaluate the resulting design at desired operating conditions; and 13. repeat steps 9 through 12 for local refinement of inlet fillet geometry until design constraints are optimally met.

Step 2–13 of the above process provides the unique internal surface geometry for integrated inlet duct 20 of the present invention. The nominal surface geometry of integrated inlet duct 20 is specified by inlet exit 25, which is fixed, and five major design parameters, each of which may vary during the iterative design process. As shown in FIG. 2, inlet exit 25 is a circle arranged perpendicularly to reference axis 26. The five variable design parameters are: (1) shape of inlet opening 23; (2) inlet duct inclination angle 28; (3) length of integrated inlet duct 20 from inlet plane to exit plane; (4) aspect ratio of inlet to exit (area of inlet opening 23/area of inlet exit 25); and (5) local geometric refinement of fillet 29. Iterations on variable design parameters 1 through 4 are performed during step 2 through 8. Iterations on variable design parameter 5 are performed during steps 9 through 13.

The first iteration of inlet duct geometry (initial input to step 2) is determined by the designer based on gross sizing information of the associated water jet propulsion system and is guided by theory and experience. The required shape of inlet exit 25 is a circle (i.e., inlet exit 25 has a circular cross-section at the exit plane of integrated inlet duct 20). Furthermore, it is required that inlet exit 25 be positioned perpendicularly to central reference axis 26 and be arranged concentrically therewith. Based on the desired system mass flow rate and exit head, the area of circular inlet exit 25 (i.e., cross-sectional area at the exit plane) is determined. Generally, the diameter of inlet exit 25 is substantially equal to the diameter of the impeller of the water jet pump. The area of inlet exit 25 remains fixed throughout the iterative design process. The nominal shape of inlet opening 23 is curvilinear, preferably a circle, ellipse, or oval. Inlet duct inclination angle 28 is between about 45° and about 75°. The angle should be as steep as possible in order to provide improved performance at off-design speeds. Inclination angle 28 is the angle between centrally located reference axis 26 and the inlet plane. The length of integrated inlet duct 20, which should be as short as possible to minimize duct losses, is generally less than or equal to the diameter of inlet exit 25.

Subsequent iterations of inlet duct geometry (accomplished during repeated step 2, as performed during step 6, and during repeated step 9, as performed during step 13) are based on the hydrodynamic analysis and evaluation of the preceding duct geometry (performed during steps 4–5 and steps 11–12, respectively) and on modifications of duct geometry by the designer based on his or her experience and theoretical knowledge of how best to optimize the resulting flow. The manipulation of the duct geometry, as performed during steps 2 and 9, is facilitated by the use of Inlet Geometric Design Module which is more fully described hereinafter.

As depicted in FIGS. 1, 2, 5a and 5b, the geometric shape of integrated inlet duct 20, as constrained by the above design parameters and design constraints, is a Bezier surface characterized by a series of fifth-order Bezier cross-link curves. Each Bezier curve is explicitly and uniquely defined by five control points (P1 through P5 in FIG. 5a) which are the independent variables of the Bezier basis function. The generation of Bezier curves based on Bezier control points and tangency conditions, as described for example in Mortenson, Michael E., *GEOMETRIC MODELING*, New York, John Wiley and Sons, Inc., 1985, QA447.M62, is well known and will not be described in detail herein. Control points 1 through 5 of each Bezier curve are defined by stations 1 through 5, respectively, located in axially spaced planes along integrated inlet duct 20. Each Bezier curve has one control point nominally located on the periphery of each of the five stations. Thus, control points 1-5 are defined by stations 1-5, respectively.

Figure 6:
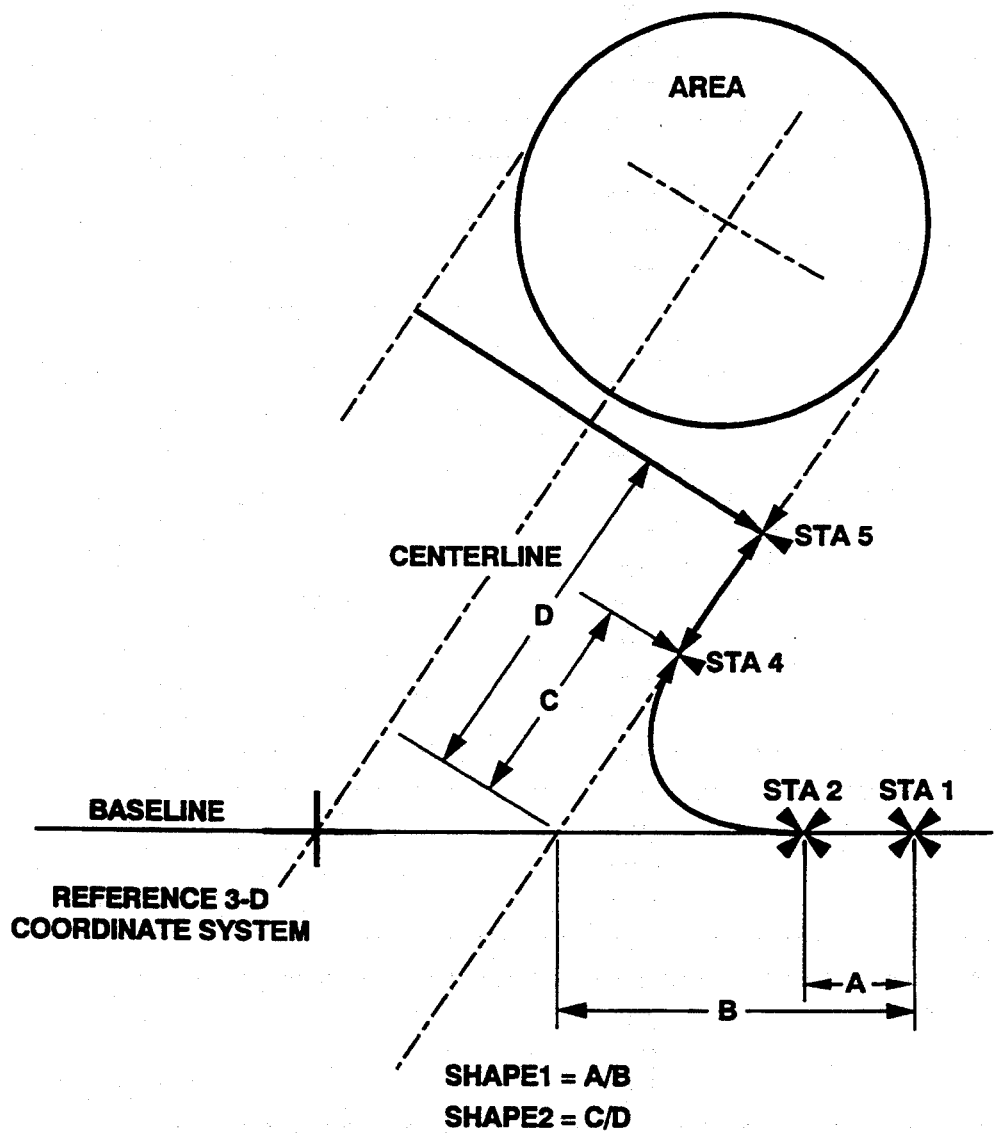
FIGS. 6. and 7. are diagrammatic representations of the determination of stations 1 through 5.
Figure 7:
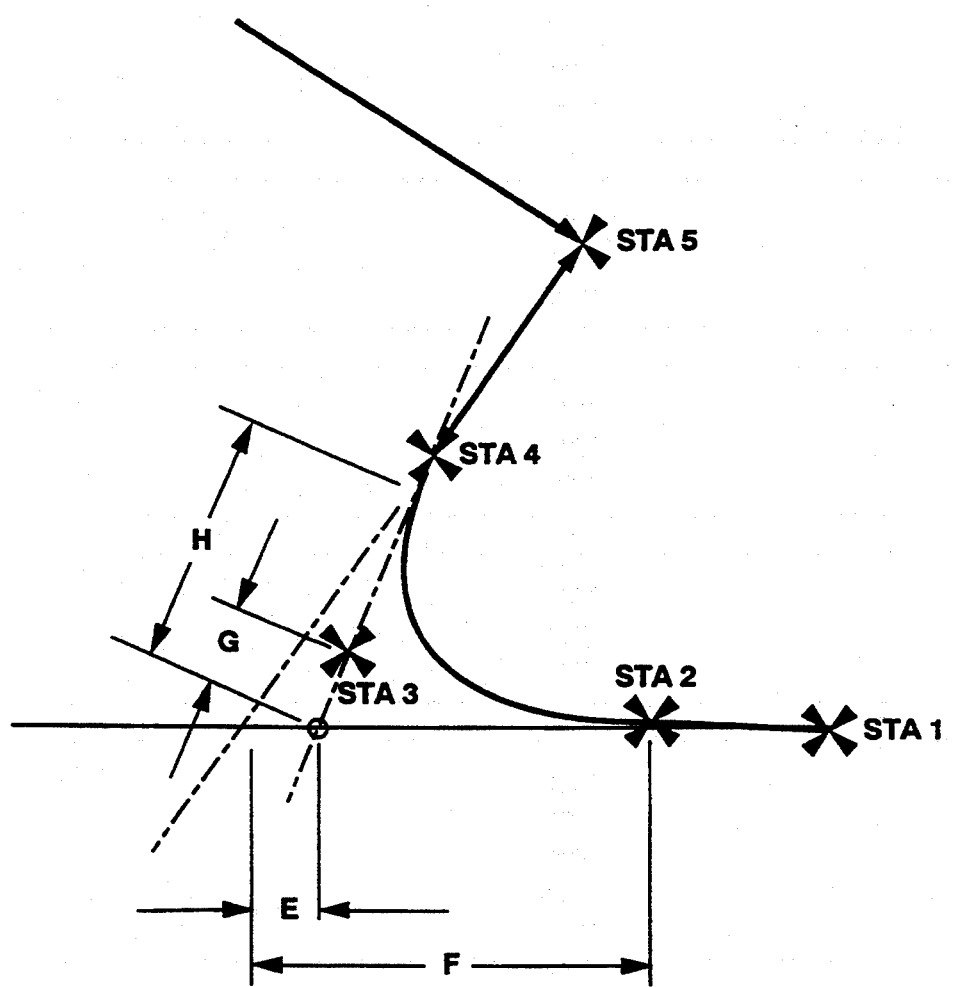
Figure 9A:
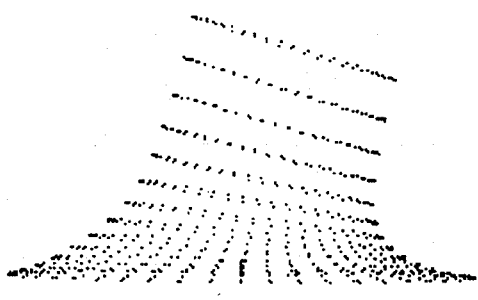
FIGS. 9a. and 9b. depict the effect of shape1 of the Inlet Geometric Design Module of the present invention.
Figure 9B:
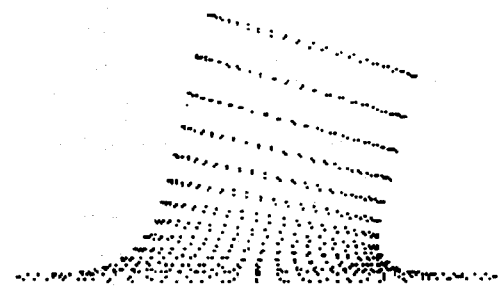
Figure 10A:
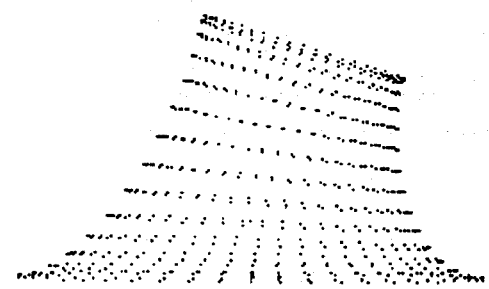
FIGS. 10a. and 10b. depict the effect of shape2 of the Inlet Geometric Design Module of the present invention.
Figure 10B:
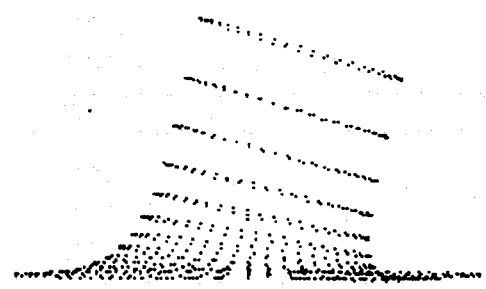
Figure 11A:
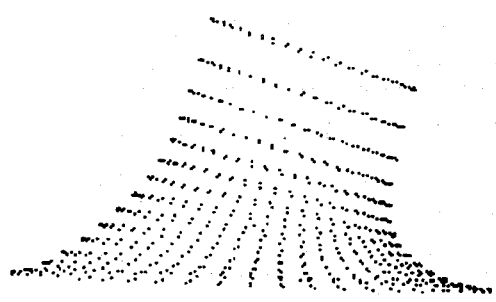
FIGS. 11a. and 11b. depict the effect of shape3 of the Inlet Geometric Design Module of the present invention.
Figure 11B:
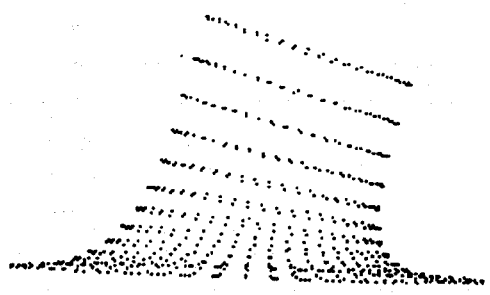
Figure 12A:
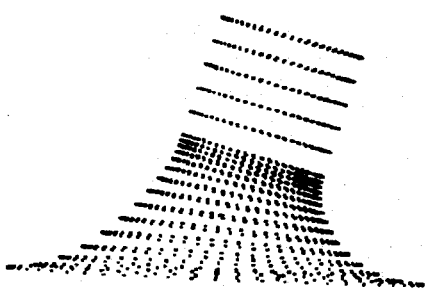
FIGS. 12a. and 12b. depict the effect of shape4 of the Inlet Geometric Design Module of the present invention.
Figure 12B:
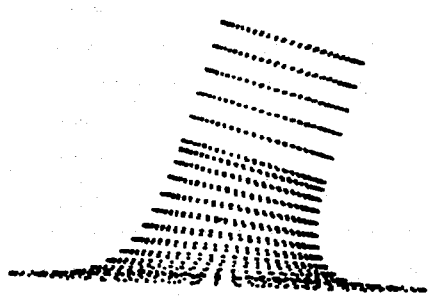

Referring to FIGS. 5, 6 and 7, the five stations are determined as follows: station 1 coincides with inlet opening 23; station 5 coincides with inlet exit 25; stations 2 and 4 are based on constraining the tangency conditions at stations 1 and 5, respectively (determine flow tangency with the inlet duct at the inlet plane and the exit plane, respectively); and station 3, which determines the shape of fillet 29, is based on the requirement of a smooth transition and attached flow (no separation) between the inlet region defined by stations 1 and 2 and the exit region defined by stations 4 and 5. The location and placement of control points, as determined by Inlet Geometric Design Module, is consistent with CAD wireframe modeling of lofting curves. A predetermined equal number of points (X points) is distributed around the circumference of each the five stations and, thus, establishes a like number of sets of five control points (X sets of five control points P1 through P5). A Bezier cross-link curves is then generated for each set of five control points. The number of Bezier curves (and corresponding number of points per station), based on a trade off between computing economy and required definition of the surface geometry to provide an acceptable hydrodynamic evaluation of the resulting flow, is selected by the designer based on knowledge and experience. Each curve is determined independently, however, the location of stations 1-5 and of the control points on each station are constrained to producing a family of curves defining a continuous smooth surface. Thus, the inlet duct contour is produced by forming smooth transitions between adjacent curves to form a continuous smooth surface.

Referring to FIG. 3b, internal surface geometry of integrated inlet duct 20 is systematically determined, using Inlet Geometric Design Module, as follows:

(a) determine shape and area of inlet opening 23 (initially designer's choice within listed constraints), wherein the inlet opening has an aspect ratio of a major to a minor dimension associated therewith, and wherein the inlet opening is located in the inlet plane;

(b) determine inlet duct inclination angle 28 (initially designer's choice within listed constraints);

(c) determine length of integrated inlet duct 20 (initially designer's choice within listed constraints);

(d) determine stations 1 through 5, wherein stations 1 through 5 determine the placement of the series of five associated control points P1 through P5, each of stations 1 through 5 being nominally located in a plane, stations 1 through 5 defined as follows (see FIGS. 6 and 7):

(i) station 1 coincides with inlet opening 23 at the inlet plane, wherein the plane of station 1 nominally coincides with the inlet plane, the aspect ratio of station 1 is equal to the aspect ratio of inlet opening 23, and wherein control points on station 1 are located around a periphery of inlet opening 23;

(ii) station 5 coincides with inlet exit 25 at the exit plane, wherein the plane of station 5 coincides with the exit plane, wherein inlet exit 25 is a circle and is arranged perpendicularly to reference axis 26 and concentrically therewith, and further wherein control points on station 5 are located around a periphery of inlet exit 25;

(iii) station 4 is a circle arranged perpendicularly to reference axis 26 (thus stations 4 and 5 define a cylinder that is concentric with reference axis 26) and is specified by the tangency conditions of the Bezier curve at station 5 and the distance between station 4 and 5 (the distance between stations 4 and 5 determines the extent to which the Bezier curve is tangent to the cylinder defined by stations 4 and 5—the greater the distance, the longer the curve remains tangent);

(iv) station 2 is required to be in the same nominal plane as station 1 (tangency condition of the Bezier curve at station 1), must be completely circumscribed by station 1, and has the same aspect ratio of major to minor dimensions as station 1;

(v) station 3 is in a plane nominally perpendicular to reference axis 26 and is iteratively determined, preferably using the Inlet Geometric Design Module, based on the requirement of a smooth transition between the inlet curve, as constrained by stations 1 and 2, and the exit curve, as constrained by stations 4 and 5, such that the resulting flow follows the curve (i.e., resulting pressure gradients that prevent flow separation);

(e) distribute a predetermined number X of peripherally distributed control points around each of stations 1 through 5, the control points provide X sets of five control points, initially each set defining a plane passing through the five control points and reference axis 26;

(f) generate a series of X Bezier curves, each Bezier curve uniquely defined by a set of five control points; and (g) interpolate a predetermined number of points along the Bezier curves to serve as grid points for panel representation of inlet duct surface.

Each of control points 1-5 influences the curve in the vicinity of that point. The final location of the control points is constrained to producing a family of curves, and resulting duct geometry, such that flow remains tangent to the duct at the inlet plane and exit plane and follows the surface of the duct therebetween without flow separation. Station 5 is fixed throughout the iterative process. Consequently, stations 1 through 4 are systematically varied during the iterative process in order to optimize duct geometry.

Each resulting inlet duct geometric arrangement is evaluated by panel method and potential flow theory, using commercially available software as detailed above. The geometric arrangement of the inlet duct surface, as defined by the series of X Bezier curves, establishes the pressure and velocity distribution within integrated inlet duct 20 and influences the pressure and velocity distribution over the aft portion of marine vehicle 10. Therefore, the geometric arrangement of integrated inlet duct 20 is determined so that, over the desired speed range, thrust deduction fraction is minimized, absolute pressure remains above the vapor pressure of the water at all points on the surface of integrated inlet duct 20, and pressure gradients over the panel model are optimized. Once a panel representation of a particular iteration of duct geometry is generated and the resulting flow is analyzed, the designer must evaluate the pressures and velocity distributions to see if the design constraints are satisfactorily met. If the design constraints are not met to the satisfaction of the designer, the designer must use his or her knowledge of hydrodynamics and duct design to modify the duct geometry.

Figure 15:
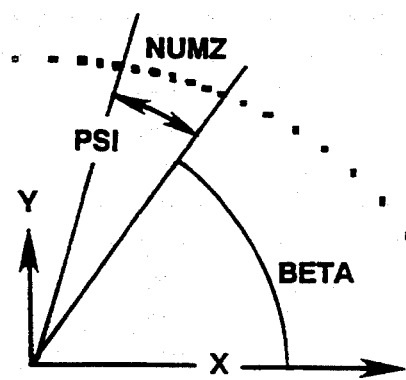
FIG. 15. depicts point condensation on station 2 during angular bias of points on station 2 relative to station 1.
Figure 16:
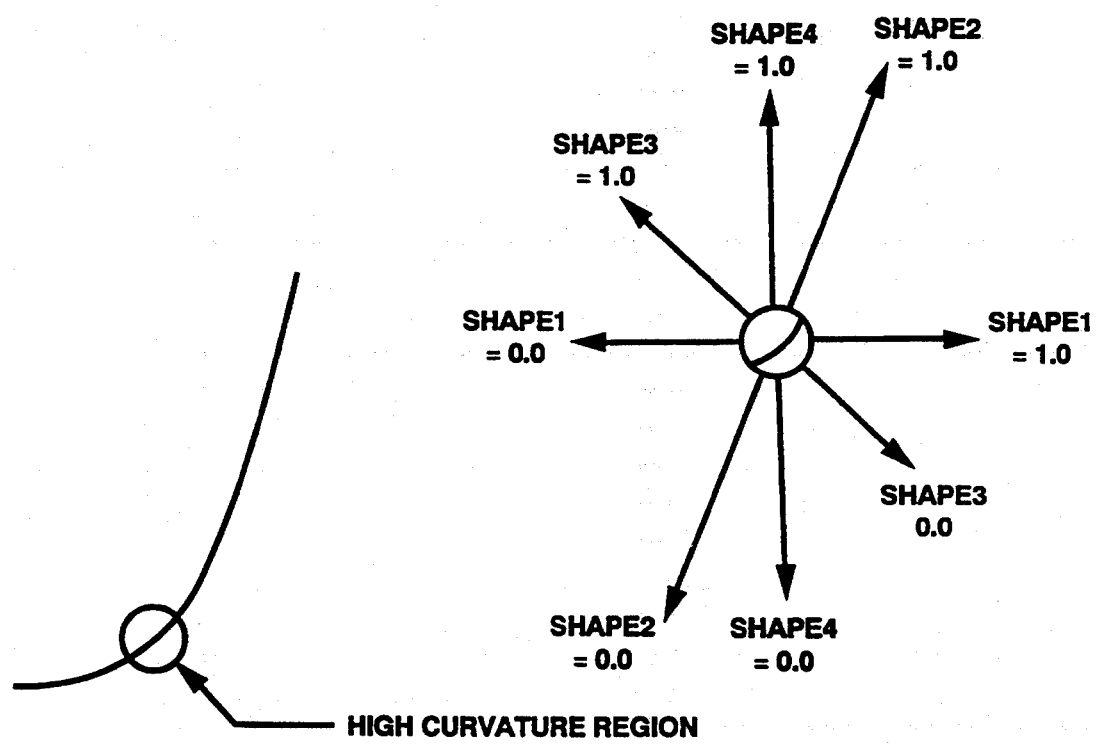
FIG. 16. depicts the effects of shape1 through shape4 of the Inlet Geometric Design Module of the present invention.

The geometric contour of integrated inlet duct 20 is iteratively designed using the design methodology presented herein. The Inlet Geometric Design Module employed in steps 2 and 9 provides the mechanism by which the designer may directly manipulate the inlet duct surface geometry and, thus, the placement of Bezier curve control points that define the surface curves. A software listing of the Inlet Geometric Design Module is provided in the Appendix attached hereto. The input parameters for the Inlet Geometric Design Module by which the designer manipulates the inlet duct geometry (as depicted in FIGS. 5-16) is as follows:

Area = nominal cross-sectional area of inlet exit
Aspect1 = aspect ratio of inlet opening area to inlet exit area
Aspect2 = aspect ratio of inlet curve (major axis/minor axis)
squash = squash factor for shape of inlet opening, having the following limits:
    0.0 = no squash (ellipse)
    0.5 = high squash (FIG. 8)
    (note: Aspect1, Aspect2 and squash control the shape and area of inlet opening)
theta = inclination angle of inlet duct
length = length of inlet duct from inlet opening to inlet exit
nump = number of cross-link curves
numq = number of interpolated points per cross-link curve
shape1 = shape control parameter for tangency with inlet opening curve, having the following limits:
    0.0 = full fillet (FIG. 9a)
    1.0 = fine fillet (FIG. 9b)
    (note: shape1 controls location of station 2 relative to station 1)
shape2 = shape control parameter for tangency with straight cylinder defined by stations 4 and 5, having the following limits:
    1.0 = full fillet (FIG. 10a)
    0.0 = fine fillet (FIG. 10b)
    (note: shape2 controls location of station 4 relative to station 5)
shape3 = shape control parameter for fillet shift, having the following limits:
    1.0 = full fillet (FIG. 11a)
    0.0 = fine fillet (FIG. 11b)
shape4 = shape control parameter for fillet shift, having the following limits:
    1.0 = full fillet (FIG. 12a)
    0.0 = fine fillet (FIG. 12b)
    (note: shape3 and shape4 control location of station 3 relative to stations 2 and 4)
bias1 = linear bias factor for station 1 (i.e., inlet opening curve), having the following limits:
    −1.0 = high bias toward leading edged (FIG. 13)
    1.0 = high bias toward trailing edge
    0.0 no bias
    (note: bias1 specifies the longitudinal location of station 1 relative to reference axis 26)
bias2 = linear bias factor for station 2, having the following limits:
    −1.0 = high bias toward leading edged
    1.0 = high bias toward trailing edge (FIGS. 14a and 14b)
    0.0 no bias
    (note: bias2 specifies the longitudinal location of station 2 relative to station 1)
beta = begin angle of point condensation
psi = include angle of point condensation
numz = number of points in psi
    (note: beta, psi and numz control point condensation during angular bias of points on station 2 relative to points on station 1, as shown in FIG. 15, point condensation is performed in a symmetric manner relative to the longitudinal centerline of inlet opening 23)
$r(3,i,j)$ = vertices of bezier surface of hull patch
nums = number of points on hull surface patch in a direction radially outward from the periphery of inlet opening 23
extend = straight cylinder extension to inlet duct 20 at inlet exit 25, extension concentric with reference axis 26
numr = number of points on cylinder extension in axial direction As depicted in FIGS. 5-16, the Inlet Geometric Design Module provides the designer the tool to interactively modify the surface geometry of inlet duct 20 during the iterative process. Initial inlet duct geometry is determined by the designer based on gross sizing information of the associated water jet, guided by theory and experience, by specifying the inlet exit area (Area, which remains fixed), the variable design parameters 1-4 (Aspect1, Aspect2, squash, theta, and length), and by initially locating stations 1-5 (using shape1--shape4). Subsequent iterations of inlet duct surface geometry are accomplished during repeated step 2, as performed during step 6, by varying variable design parameters 1-4 and the shape control parameters shape1-shape4, and during repeated step 9, as performed during step 13, by varying variable design parameter 5 using linear bias factors bias1 and bias2, and angular bias factors beta, psi and numz, and by any required small variations to shape1-shape4 to optimize the hydrodynamic design constraints. Since inlet duct 20 is intended to be a flush inlet, the program further ensures that the inlet duct, adjacent inlet opening 23, is tangent to the surrounding hull surface. Inlet opening 23 is nominally in a plane, the program projects the opening onto the hull surface and then adjusts the opening to be tangent with the hull surface.

Additionally, the Inlet Geometric Design Module interpolates point locations on the resulting Bezier curves. The interpolated points serve as a panel grid for direct input to the panel method software for defining the panel representation of the surface contours of the inlet duct. The inlet duct surface data information of the final panel method representation may then be linked to any of numerous well known computer aided design-/computer aided manufacturing (CAD/CAM) software packages to provide surface coordinates of the duct surface. The data may then be input into, for example, a numerical cutting or milling machine to produce the finished product. Alternatively, the methods described in U.S. Pat. Nos. 5,282,143 entitled "Method and System for Machining a Sculptured Surface" and 5,236,637 entitled "Method of and Apparatus for Production of Three Dimensional Objects by Stereolithography," both incorporated herein by reference, may be used to produce the finished duct shape.

The advantages of the present invention are numerous. The iterative inlet design method of the present invention offers a simple, economic means of modifying the inlet design and evaluating the effects of the modifications within the iterative process. Relative to prior art inlet design methods, the present design method produces an inlet duct design having high efficiency and good cavitation performance at both low speeds and high speeds. The present method offers flexibility of inlet placement while minimizing the various losses associated with the inlet.

Relative to prior art water jet inlets, off-design point performance, especially low speed performance, is improved. The resulting short integrated inlet duct minimizes inlet duct losses, while maximizing water jet performance characteristics over a wide speed range. The integrated stern/flush inlet design minimizes or eliminates separation and provides a substantially cavitation free flow of water through the exit plane over a wide speed range.

The inlet duct design method and resulting integrated inlet duct of the present invention are applicable both to marine vehicles such as large monohulls and tug boats that require good low speed performance (high propulsive efficiency or high thrust at low speed) and to high speed vehicles such as planing hulls, surface effect vessels, recreational crafts, and jet skis that require good high speed performance. The design method offers an economic method of designing an inlet duct for a particular application.

The present invention and many of its attendant advantages will be understood from the foregoing description and it will be apparent to those skilled in the art to which the invention relates that various modifications may be made in the form, construction and arrangement of the elements of the invention described herein without departing from the spirit and scope of the invention or sacrificing all of its material advantages. The forms of the present invention herein described are not intended to be limiting but are merely preferred or exemplary embodiments thereof.

APPENDIX

```
      program inlet
C shape inlet with following parameters
C     theta = angle of inclination
C     length = inlet duct length
C     Area = nominal cross-sectional area of inlet exit
C     Aspect1 = aspect ratio of inlet opening area to inlet exit area
C     Aspect2 = aspect ratio of inlet curve
C     squash = squash factor for egg
C     nump = number of cross-link curves
C     numq = number of points per cross-link curve
C     numr = number of points on extend cylinder
C     shape1 = shape control parameter 1
C     shape2 = shape control parameter 2
C     shape3 = shape control parameter 3
C     shape4 = shape control parameter 4
C     bias1 = bias factor for inlet opening curve
C     bias2 = bias factor for control curve 2
C     extend = straight cylinder extension
C     beta = begin angle of point condensation
C     psi = include angle of point condensation
C     numz = number of points (odd) in psi
C     r(3,i,j) = vertices of bezier surface
C     nums = number of points on surf patch in k direction
C
```

```
      integer nump, numq, numr, numz, n, ni, m, k, l, nums
      integer counta,testa,countb,num_params
      integer index1,index2,iflag
      real theta, length, Area, Aspect1, Aspect2, shape1
      real shape2, shape3, Ainlet, pi,inc, squash, bias1
      real bias2, shape4, beta, psi
      real x(80,30),y(80,30),z(80,30)
      real px(80,6),py(80,6),pz(80,6)
      real extend,delx,delz,angle
      real s,t,q(4)
      real r(3,8,8),rx(4,80,30),ry(4,80,30),rz(4,80,30)
      real initial_param(4),initial_delta(4),good_guess(4)
      real accept,target(4),edge(5,20,3)
      real eta,zeta,inceta,inczeta,ss(5)
      real norm(4),tani(4),statwo(4),newtwo(4)
      real mag,dist
      real space,ratio
      character*60 infile,outfile
      character*80 string
      print *, 'input data file name'
      read (*,11) infile
      print *, 'enter output file name'
      read (*,11) outfile
      open (unit=1,file=infile,status='old')
      open (unit=2,file=outfile,status='unkown')
      read (1,13) string
C input parameters for inlet
      read (1,*) theta,length,Area
      read (1,*) Aspect1,Aspect2,squash
      read (1,*) nump,numq,numr
      read (1,*) shape1,shape2,shape3,shape4,bias1,bias2
      read (1,*) extend
      read (1,*) beta,psi,numz
      read (1,*)
C input parameters for surface
      read (1,*) n
      do 1010 i=1,n
       do 1010 j=1,n
        read (1,*) (r(k,i,j),k=1,3)
 1010 continue
      read (1,*) nums
      read (1,*) ratio
      pi=3.14159
      Ainlet=Area*Aspect1
      call assignp5(shape2,Area,theta,length,nump,px,py,pz)
      call assignp1(Area,squash,shape1,shape3,shape4,Ainlet,
     *theta,Aspect2,bias1,bias2,beta,psi,nump,numz,px,py,pz)
      do 19 i=1,5
       print *, pz(51,i)
```

```
19   continue
     call calc_pts(nump,numq,px,py,pz,x,y,z)
     angle=pi/180.0*theta
     delx=extend*cos(angle)
     delz=extend*sin(angle)
     write (2,13) string
     delz=delz/numr
     delx=delx/numr
C calculate points on surface
     counta=nump/4
     testa=(counta/2)*2
     if (testa.eq.counta) then
       counta=counta/2
       countb=counta
     else
       counta=counta/2
       countb=counta/2+1
     endif
C    initial_param : 1 : s
C    initial_param : 2 : t
     initial_param(1)=0.5
     initial_param(2)=0.5
     initial_delta(1)=0.1
     initial_delta(2)=0.1
     num_params=2
     accept=0.0001
     do 1020 i=1,4
C Calculate patch 1
        if (i.eq.1) then
          inceta=0.5/countb
          inczeta=1.0/nums
          index1=nump*3/4+1-countb
          index2=nump*3/4+1+countb
          do 1030 j=index1,index2
            iflag=0
     initial_param(1)=0.5
     initial_param(2)=0.5
     initial_delta(1)=0.1
     initial_delta(2)=0.1
            l=j-index1+1
            target(1)=x(j,1)
            target(2)=y(j,1)
            target(3)=z(j,1)
            print *
            print *, 'point ',j
            print *
C Call pattern search to find parametric value on bezier
C surface patch corresponding to projected point on inlet
C edge.
```

```
      call pattern(initial_param,initial_delta,
*     num_params,target,accept,good_guess,r,n,iflag)
          edge(i,l,1)=good_guess(1)
          edge(i,l,2)=good_guess(2)
          s=good_guess(1)
          t=good_guess(2)
          call surf(r,s,t,q,n)
1030      continue
      m=2*countb+1
      do 1040 j=index1,index2
        l=j-index1+1
        eta=inceta*(l-1)
        space=(1.0-ratio)/(1.0+ratio)*0.1
        zeta=-(1.0/nums+space*(1.0+2.0/(nums-1.0)))
        do 1040 k=1,nums
          zeta=zeta+1.0/nums+space*(1.0-((k-2.0)/
*         (nums-1.0)*2.0))
          ss(2)=eta*(1.0-(1.0-edge(i,m,1))*zeta)
          ss(4)=(1.0-eta)*edge(i,1,1)*zeta
          s=ss(2)+ss(4)
          ss(1)=(1.0-zeta)*0.0
          ss(3)=zeta*edge(i,l,2)
          t=ss(1)+ss(3)
          call surf(r,s,t,q,n)
          rx(i,l,k)=q(1)
          ry(i,l,k)=q(2)
          rz(i,l,k)=q(3)
1040      continue
C Calculate patch 2
      else if (i.eq.2) then
      inceta=1.0/nums
      inczeta=0.5/counta
      index1=nump+1-counta
      index2=counta+1
      do 1050 j=index1,nump
        iflag=0
        print *
        print *, 'point ',j
        print *
    initial_param(1)=0.5
    initial_param(2)=0.5
    initial_delta(1)=0.1
    initial_delta(2)=0.1
        l=j-index1+1
        target(1)=x(j,1)
        target(2)=y(j,1)
        target(3)=z(j,1)
        call pattern(initial_param,initial_delta,
*       num_params,target,accept,good_guess,r,n,iflag)
```

```
            edge(i,l,1) = good_guess(1)
1050        edge(i,l,2) = good_guess(2)
        do 1060 j = 1,index2
          iflag = 0
          print *
          print *, 'point ',j
          print *
    initial_param(1) = 0.5
    initial_param(2) = 0.5
    initial_delta(1) = 0.1
    initial_delta(2) = 0.1
          l = nump-index1 + 1 + j
          target(1) = x(j,1)
          target(2) = y(j,1)
          target(3) = z(j,1)
          call pattern(initial_param,initial_delta,
     *        num_params,target,accept,good_guess,r,n,iflag)
          edge(i,l,1) = good_guess(1)
1060      edge(i,l,2) = good_guess(2)
        m = 2*counta + 1
        do 1070 j = 1,m
          zeta = inczeta*(j-1)
          space = (1.0-ratio)/(1.0+ratio)*0.1
          eta = 0.0
          do 1070 k = 1,nums
            l = nums-k+1
            eta = eta + 1.0/nums + space*(1.0-((l-1.0)/
     *          (nums-1.0)*2.0))
            ss(2) = eta*1.0
            ss(4) = (1.0-eta)*edge(i,j,1)
            s = ss(2) + ss(4)
            ss(1) = (1.0-zeta)*(1.0-eta)*edge(i,1,2)
            ss(3) = zeta*(eta*(1.0-edge(i,m,2))+edge(i,m,2))
            t = ss(1) + ss(3)
            call surf(r,s,t,q,n)
            rx(i,j,l) = q(1)
            ry(i,j,l) = q(2)
            rz(i,j,l) = q(3)
1070      continue
C Calculate patch 3
        else if (i.eq.3) then
          inceta = 0.5/countb
          inczeta = 1.0/nums
          index1 = nump*1/4 + 1-countb
          index2 = nump*1/4 + 1+countb
          do 1080 j = index1,index2
            iflag = 0
            print *
            print *, 'point ',j
            print *
```

```
       initial_param(1)=0.5
       initial_param(2)=0.5
       initial_delta(1)=0.1
       initial_delta(2)=0.1
           l=j-index1+1
           target(1)=x(j,1)
           target(2)=y(j,1)
           target(3)=z(j,1)
           call pattern(initial_param,initial_delta,
     *        num_params,target,accept,good_guess,r,n,iflag)
           edge(i,l,1)=good_guess(1)
1080       edge(i,l,2)=good_guess(2)
         m=2*countb+1
         do 1090 j=index1,index2
         l=j-index1+1
         eta=inceta*(m-l)
         space=(1.0-ratio)/(1.0+ratio)*0.1
         zeta=-(1.0/nums+space*(1.0+2.0/(nums-1.0)))
         do 1090 k=1,nums
           zeta=zeta+1.0/nums+space*(1.0-((k-2.0)/
     *        (nums-1.0)*2.0))
           ss(2)=eta*((edge(i,1,1)-1.0)*zeta+1.0)
           ss(4)=(1.0-eta)*edge(i,m,1)*zeta
           s=ss(2)+ss(4)
           ss(3)=(1.0-zeta)*1.0
           ss(1)=zeta*edge(i,l,2)
           t=ss(1)+ss(3)
           call surf(r,s,t,q,n)
           rx(i,l,k)=q(1)
           ry(i,l,k)=q(2)
           rz(i,l,k)=q(3)
1090     continue
C Calculate patch 4
         else if (i.eq.4) then
         inceta=1.0/nums
         inczeta=0.5/counta
         index1=nump/2+1-counta
         index2=nump/2+1+counta
         do 1100 j=index1,index2
           print *
           print *, 'point ',j
           print *
           iflag=0
       initial_param(1)=0.5
       initial_param(2)=0.5
       initial_delta(1)=0.1
       initial_delta(2)=0.1
           l=j-index1+1
           target(1)=x(j,1)
```

```
              target(2)=y(j,1)
              target(3)=z(j,1)
              call pattern(initial_param,initial_delta,
     *          num_params,target,accept,good_guess,r,n,iflag)
              edge(i,l,1)=good_guess(1)
1100          edge(i,l,2)=good_guess(2)
           m=2*counta+1
           do 1110 j=1,m
             l=m-j+1
             zeta=inczeta*(j-1)
             space=(1.0-ratio)/(1.0+ratio)*0.1
             eta=-(1.0/nums+space*(1.0+2.0/(nums-1.0)))
             do 1110 k=1,nums
               eta=eta+1.0/nums+space*(1.0-((k-2.0)/
     *           (nums-1.0)*2.0))
               ss(2)=eta*edge(i,j,1)
               ss(4)=(1.0-eta)*0.0
               s=ss(2)+ss(4)
               ss(1)=(1.0-zeta)*eta*edge(i,m,2)
               ss(3)=zeta*(eta*(edge(i,1,2)-1.0)+1.0)
               t=ss(1)+ss(3)
               call surf(r,s,t,q,n)
               rx(i,l,k)=q(1)
               ry(i,l,k)=q(2)
               rz(i,l,k)=q(3)
1110         continue
          endif
1020      continue
C Calculate surface normals at inlet lower edge
C patch1
          m=2*countb+1
          index1=nump*3/4+1-countb
          index2=nump*3/4+1+countb
          do 1120 i=1,m
            do 1122 j=1,nums
              write(2,9010) rx(1,i,j),ry(1,i,j),rz(1,i,j)
1122        continue
            k=index1+i-1
            s=edge(1,i,1)
            t=edge(1,i,2)
            call surf(r,s,t,q,n)
            do 1121 j=2,4
              pz(k,j)=pz(k,j)+(1.0-(pz(k,j)-pz(k,1))/
     *          (pz(k,5)-pz(k,1)))*q(3)
1121        continue
            pz(k,1)=pz(k,1)+q(3)
            px(k,4)=px(k,5)-(pz(k,5)-pz(k,4))*delx/delz
          call surfnorm(r,s,t,norm,n)
          call fixtwo(k,px,py,pz,norm)
```

```
      call calc_ptsa(k,numq,px,py,pz,x,y,z)
      do 1123 j=1,numq
        write (2,9010) x(k,j),y(k,j),z(k,j)
1123  continue
      do 1124 j=numq+1,numq+numr
        z(k,j)=z(k,j-1)+delz
        y(k,j)=y(k,j-1)
        x(k,j)=x(k,j-1)+delx
        write (2,9010) x(k,j),y(k,j),z(k,j)
1124  continue
1120  continue
C Patch2
      m=2*counta+1
      index1=nump+1-counta
      index2=counta+1
      do 1130 i=2,counta
        do 1132 j=1,nums
          write(2,9010) rx(2,i,j),ry(2,i,j),rz(2,i,j)
1132    continue
        k=index1+i-1
        s=edge(2,i,1)
        t=edge(2,i,2)
        call surf(r,s,t,q,n)
        do 1131 j=2,4
          pz(k,j)=pz(k,j)+(1.0-(pz(k,j)-pz(k,1))/
     *    (pz(k,5)-pz(k,1)))*q(3)
1131    continue
        pz(k,1)=pz(k,1)+q(3)
        px(k,4)=px(k,5)-(pz(k,5)-pz(k,4))*delx/delz
        call surfnorm(r,s,t,norm,n)
        call fixtwo(k,px,py,pz,norm)
        call calc_ptsa(k,numq,px,py,pz,x,y,z)
        do 1133 j=1,numq
          write (2,9010) x(k,j),y(k,j),z(k,j)
1133    continue
        do 1134 j=numq+1,numq+numr
          z(k,j)=z(k,j-1)+delz
          y(k,j)=y(k,j-1)
          x(k,j)=x(k,j-1)+delx
          write (2,9010) x(k,j),y(k,j),z(k,j)
1134    continue
1130  continue
      do 1135 i=counta+1,m
        do 1136 j=1,nums
          write(2,9010) rx(2,i,j),ry(2,i,j),rz(2,i,j)
1136    continue
        k=i-counta
        s=edge(2,i,1)
        t=edge(2,i,2)
```

```
      call surf(r,s,t,q,n)
      do 1137 j=2,4
       pz(k,j)=pz(k,j)+(1.0-(pz(k,j)-pz(k,1))/
     *   (pz(k,5)-pz(k,1)))*q(3)
1137  continue
      pz(k,1)=pz(k,1)+q(3)
      px(k,4)=px(k,5)-(pz(k,5)-pz(k,4))*delx/delz
      call surfnorm(r,s,t,norm,n)
      call fixtwo(k,px,py,pz,norm)
      call calc_ptsa(k,numq,px,py,pz,x,y,z)
      do 1138 j=1,numq
       write (2,9010) x(k,j),y(k,j),z(k,j)
1138  continue
      do 1139 j=numq+1,numq+numr
       z(k,j)=z(k,j-1)+delz
       y(k,j)=y(k,j-1)
       x(k,j)=x(k,j-1)+delx
       write (2,9010) x(k,j),y(k,j),z(k,j)
1139  continue
1135  continue
C Patch3
      m=2*countb+1
      index1=nump/4+1-countb
      index2=nump/4+1+countb
      do 1140 i=2,m
       do 1142 j=1,nums
        write(2,9010) rx(3,i,j),ry(3,i,j),rz(3,i,j)
1142   continue
       k=index1+i-1
       s=edge(3,i,1)
       t=edge(3,i,2)
       call surf(r,s,t,q,n)
       do 1141 j=2,4
        pz(k,j)=pz(k,j)+(1.0-(pz(k,j)-pz(k,1))/
     *    (pz(k,5)-pz(k,1)))*q(3)
1141   continue
       pz(k,1)=pz(k,1)+q(3)
       px(k,4)=px(k,5)-(pz(k,5)-pz(k,4))*delx/delz
       call surfnorm(r,s,t,norm,n)
       call fixtwo(k,px,py,pz,norm)
       call calc_ptsa(k,numq,px,py,pz,x,y,z)
       do 1143 j=1,numq
        write (2,9010) x(k,j),y(k,j),z(k,j)
1143   continue
       do 1144 j=numq+1,numq+numr
        z(k,j)=z(k,j-1)+delz
        y(k,j)=y(k,j-1)
        x(k,j)=x(k,j-1)+delx
        write (2,9010) x(k,j),y(k,j),z(k,j)
```

```
1144    continue
1140    continue
C Patch4
      m=2*counta+1
      index1=nump/2+1-counta
      index2=nump/2+1+counta
      do 1150 i=2,m-1
       do 1152 j=1,nums
         write(2,9010) rx(4,i,j),ry(4,i,j),rz(4,i,j)
1152    continue
       k=index1+i-1
       s=edge(4,i,1)
       t=edge(4,i,2)
       call surf(r,s,t,q,n)
       do 1151 j=2,4
        pz(k,j)=pz(k,j)+(1.0-(pz(k,j)-pz(k,1))/
     *    (pz(k,5)-pz(k,1)))*q(3)
1151    continue
       pz(k,1)=pz(k,1)+q(3)
       px(k,4)=px(k,5)-(pz(k,5)-pz(k,4))*delx/delz
       call surfnorm(r,s,t,norm,n)
       call fixtwo(k,px,py,pz,norm)
       call calc_ptsa(k,numq,px,py,pz,x,y,z)
       do 1153 j=1,numq
         write (2,9010) x(k,j),y(k,j),z(k,j)
1153    continue
       do 1154 j=numq+1,numq+numr
         z(k,j)=z(k,j-1)+delz
         y(k,j)=y(k,j-1)
         x(k,j)=x(k,j-1)+delx
         write (2,9010) x(k,j),y(k,j),z(k,j)
1154    continue
1150    continue
      close (unit=1)
      close (unit=2)
      stop
 11 format (a60)
 13 format (a80)
9010 format (3f12.6)
      end C calculate point on bezier surface patch
      subroutine surf(p,s,t,q,n)
      real q(4),p(3,8,8),c(8),d(8),a,b,s,t
      integer ii,jj,kk,n
      a=1.0-t
      b=1.0-s
      c(1)=a*a*a*a*a
      c(2)=6.0*t*a*a*a*a*a
```

```
        c(3)=15.0*t*t*a*a*a*a
        c(4)=20.0*t*t*t*a*a*a
        c(5)=15.0*t*t*t*t*a*a
        c(6)=6.0*t*t*t*t*t*a
        c(7)=t*t*t*t*t*t
        d(1)=b*b*b*b*b*b
        d(2)=6.0*s*b*b*b*b*b
        d(3)=15.0*s*s*b*b*b*b
        d(4)=20.0*s*s*s*b*b*b
        d(5)=15.0*s*s*s*s*b*b
        d(6)=6.0*s*s*s*s*s*b
        d(7)=s*s*s*s*s*s
       do 2000 kk=1,3
         q(kk)=0.0
         do 2000 ii=1,n
           do 2000 jj=1,n
 2000   q(kk)=q(kk)+p(kk,ii,jj)*d(jj)*c(ii)
       return
       end C Calculate surface normal on bezier patch
       subroutine surfnorm(p,s,t,norm,n)
       real norm(4),p(3,8,8),c(8),d(8),a,b,s,t
       real cc(8),dd(8),mag
       real ds(4),dt(4),dn(4)
       integer ii,jj,kk,n
       a=1.0-t
       b=1.0-s
       c(1)=a*a*a*a*a*a
       c(2)=6.0*t*a*a*a*a*a
       c(3)=15.0*t*t*a*a*a*a
       c(4)=20.0*t*t*t*a*a*a
       c(5)=15.0*t*t*t*t*a*a
       c(6)=6.0*t*t*t*t*t*a
       c(7)=t*t*t*t*t*t
       d(1)=b*b*b*b*b*b
       d(2)=6.0*s*b*b*b*b*b
       d(3)=15.0*s*s*b*b*b*b
       d(4)=20.0*s*s*s*b*b*b
       d(5)=15.0*s*s*s*s*b*b
       d(6)=6.0*s*s*s*s*s*b
       d(7)=s*s*s*s*s*s
       cc(1)=-6.0*a*a*a*a*a
       cc(2)=-30.0*a*a*a*a*t+6.0*a*a*a*a*a
       cc(3)=-60.0*t*t*a*a*a+30.0*t*a*a*a*a
       cc(4)=-60.0*t*t*t*a*a+60.0*t*t*a*a*a
       cc(5)=-30.0*t*t*t*t*a+60.0*t*t*t*a*a
       cc(6)=-6.0*t*t*t*t*t+30.0*t*t*t*t*a
       cc(7)=6.0*t*t*t*t*t
```

```
      dd(1)=-6.0*b*b*b*b*b
      dd(2)=-30.0*b*b*b*b*s+6.0*b*b*b*b*b
      dd(3)=-60.0*s*s*b*b*b+30.0*s*b*b*b*b
      dd(4)=-60.0*s*s*s*b*b+60.0*s*s*b*b*b
      dd(5)=-30.0*s*s*s*s*b+60.0*s*s*s*b*b
      dd(6)=-6.0*s*s*s*s*s+30.0*s*s*s*s*b
      dd(7)=6.0*s*s*s*s*s
      do 2010 kk=1,3
        dt(kk)=0.0
        do 2010 ii=1,n
          do 2010 jj=1,n
 2010   dt(kk)=dt(kk)+p(kk,ii,jj)*d(jj)*cc(ii)
      do 2020 kk=1,3
        ds(kk)=0.0
        do 2020 ii=1,n
          do 2020 jj=1,n
 2020   ds(kk)=ds(kk)+p(kk,ii,jj)*dd(jj)*c(ii)
      call cross(ds,dt,dn)
      mag=dn(1)*dn(1)+dn(2)*dn(2)+dn(3)*dn(3)
      mag=sqrt(mag)
      norm(1)=dn(1)/mag
      norm(2)=dn(2)/mag
      norm(3)=dn(3)/mag
      return
      end subroutine cross(b,c,bb)
      real b(4),c(4),bb(4)
C Cross product
      bb(1)=b(2)*c(3)-b(3)*c(2)
      bb(2)=b(3)*c(1)-b(1)*c(3)
      bb(3)=b(1)*c(2)-b(2)*c(1)
      return
      end subroutine assignp5(shape2,Area,theta,length,nump,px,py,pz)
      integer nump
      real Area,theta,length,px(80,6),py(80,6),pz(80,6)
      real shape2,inc,alpha,nomrad,angy,u,v,w,pi
      real minlength,angle
C calculate points at A exit
      pi=3.14159
      nomrad=sqrt(Area/pi)
      angle=pi/180.0*theta
      minlength=nomrad*cos(angle)/sin(angle)+0.001
      if (length.lt.minlength) length=minlength
      inc=2.0*pi/nump
      angy=pi/180.0*(90.0-theta)
      do 301 i=1,nump
```

```
      alpha = (i-1.0)*inc
      px(i,5) = nomrad*cos(alpha)
      py(i,5) = nomrad*sin(alpha)
      pz(i,5) = length
      px(i,3) = px(i,5)
      py(i,3) = py(i,5)
      pz(i,3) = 0.0
      px(i,4) = px(i,5)
      py(i,4) = py(i,5)
      if (shape2.gt.0.99) shape2 = 0.99
      pz(i,4) = shape2*(length-minlength) + minlength
      u = px(i,5)
      v = py(i,5)
      w = pz(i,5)
      call roty(angy,u,v,w)
      px(i,5) = u
      py(i,5) = v
      pz(i,5) = w
      u = px(i,4)
      v = py(i,4)
      w = pz(i,4)
      call roty(angy,u,v,w)
      px(i,4) = u
      py(i,4) = v
      pz(i,4) = w
      u = px(i,3)
      v = py(i,3)
      w = pz(i,3)
      call roty(angy,u,v,w)
      px(i,3) = u
      py(i,3) = v
301   pz(i,3) = 0.0
      return
      end subroutine assignp1(Area,squash,shape1,shape3,shape4,Ainlet,
     *theta,Aspect2,bias1,bias2,beta,zeta,nump,numz,px,py,pz)
      integer nump,nn,numz, numa,numb
      real Ainlet,px(80,6),py(80,6),pya(80,6),pz(80,6)
      real arclength,inc,alpha,pi,nomrad,Aspect2,theta
      real minor,major,Area,squash,shape1,shape3
      real radius,mindist,angle,bias1,bias2,shiftx
      real minora,majora,Aspect3,shiftxa,shape4
      real le,te,beta,zeta,arc1, arc2, arc3, diffa, diffb
      real space1, space2, space3, space4, space5
      pi = 3.14159
      nomrad = sqrt(Area/pi)
      angle = pi/180.0*theta
      mindist = nomrad*sin(angle)
```

```
      if (shape1.lt.0.001) shape1=0.001
        minor=sqrt(Ainlet*Aspect2/pi)
        major=minor/Aspect2
        majora=major-(major-mindist)*shape1
        minora=minor-(minor-nomrad)*shape1
        Aspect3=minora/majora
        inc=2.0*pi/nump
        alpha=0.0
        shiftx=(major-mindist-0.02)*bias1
        le=-major+shiftx
        te=major+shiftx
        if (majora.gt.(te-0.02)) shiftxa=te-0.02-majora
        shiftxa=shiftxa+(majora+shiftxa-mindist)*bias2
        px(1,1)=major
        py(1,1)=0.0
        pz(1,1)=0.0
        px(1,2)=majora
        py(1,2)=0.0
        pz(1,2)=0.0
        le=-major+shiftx
        te=major+shiftx
        pya(1,1)=0.0
        pya(1,2)=0.0
       ·do 201 i=1,nump-1
          k=i+1
C Formula for ellipse courtesy of Rogers p220
        px(k,1)=px(i,1)*cos(inc)-pya(i,1)*sin(inc)/Aspect2
        pya(k,1)=Aspect2*px(i,1)*sin(inc)+pya(i,1)*cos(inc)
        py(k,1)=pya(k,1)+px(k,1)*squash/major*pya(k,1)
        pz(k,1)=0.0
        px(k,2)=px(i,2)*cos(inc)-pya(i,2)*sin(inc)/Aspect3
        pya(k,2)=Aspect3*px(i,2)*sin(inc)+pya(i,2)*cos(inc)
        py(k,2)=pya(k,2)+px(k,2)*squash/majora*pya(k,2)
 201    pz(k,2)=0.0
      if (zeta.gt.0.0) then
        px(1,2)=majora
        py(1,2)=0.0
        pz(1,2)=0.0
        numa=nump/4-(numz-1)/2
        arc1=zeta*pi/180.0
        arc2=beta*pi/180.0
        arc3=pi-arc1-arc2
        space1=arc2/numa
        space2=arc1/(numz-1)
        space3=arc3/numa
        space4=space1*2.0-space2
        space5=space3*2.0-space2
        diffa=(space4-space2)/(numa-1)
        diffb=(space5-space2)/(numa-1)
```

```
      do 206 i=1,numa
      k=i+1
      inc=space4-diffa*(i-1)
      px(k,2)=px(i,2)*cos(inc)-pya(i,2)*sin(inc)/Aspect3
      pya(k,2)=Aspect3*px(i,2)*sin(inc)+pya(i,2)*cos(inc)
      py(k,2)=pya(k,2)+px(k,2)*squash/majora*pya(k,2)
206   pz(k,2)=0.0
      do 207 i=numa+1,numa+numz-1
      k=i+1
      inc=space2
      px(k,2)=px(i,2)*cos(inc)-pya(i,2)*sin(inc)/Aspect3
      pya(k,2)=Aspect3*px(i,2)*sin(inc)+pya(i,2)*cos(inc)
      py(k,2)=pya(k,2)+px(k,2)*squash/majora*pya(k,2)
207   pz(k,2)=0.0
      do 208 i=numa+numz,nump/2-1
      k=i+1
      inc=space2+diffb*(i-numa-numz)
      px(k,2)=px(i,2)*cos(inc)-pya(i,2)*sin(inc)/Aspect3
      pya(k,2)=Aspect3*px(i,2)*sin(inc)+pya(i,2)*cos(inc)
      py(k,2)=pya(k,2)+px(k,2)*squash/majora*pya(k,2)
208   pz(k,2)=0.0
      do 209 i=2,nump/2
      k=nump-i+2
      px(k,2)=px(i,2)
      py(k,2)=-py(i,2)
209   pz(k,2)=pz(i,2)
      px((nump/2+1),2)=-majora
      py((nump/2+1),2)=0.0
      pz((nump/2+1),2)=0.0
      endif
      do 205 i=1,nump
      px(i,1)=px(i,1)+shiftx
      px(i,2)=px(i,2)+shiftxa
205   continue
      do 204 i=1,nump
      px(i,3)=px(i,3)+(px(i,2)-px(i,3))*shape3
      py(i,3)=py(i,3)+(py(i,2)-py(i,3))*shape3
      pz(i,3)=pz(i,3)+(pz(i,2)-pz(i,3))*shape3
      px(i,3)=px(i,3)+(px(i,4)-px(i,3))*shape4
      py(i,3)=py(i,3)+(py(i,4)-py(i,3))*shape4
204   pz(i,3)=pz(i,3)+(pz(i,4)-pz(i,3))*shape4
      return
      end subroutine roty(angy,u,v,w)
C     rotate about y axis
      real angy,u,v,w,a
      a=u*cos(angy)+w*sin(angy)
```

```fortran
      return
      end subroutine calc_pts(nump,numq,px,py,pz,x,y,z)
      integer nump,numq
      real px(80,6),py(80,6),pz(80,6),x(80,30)
      real y(80,30),z(80,30),inc
      real a,t,c1,c2,c3,c4,c5
      inc=1.0/(numq-1.0)
      do 401 i=1,nump
        do 401 j=1,numq
          t=(j-1.0)*inc
          a=1.0-t
          c1=a*a*a*a
          c2=a*a*a*t*4
          c3=6.0*t*t*a*a
          c4=4.0*t*t*t*a
          c5=t*t*t*t
          x(i,j)=px(i,1)*c1+px(i,2)*c2+px(i,3)*c3+
     *px(i,4)*c4+px(i,5)*c5
          y(i,j)=py(i,1)*c1+py(i,2)*c2+py(i,3)*c3+
     *py(i,4)*c4+py(i,5)*c5
          z(i,j)=pz(i,1)*c1+pz(i,2)*c2+pz(i,3)*c3+
     *pz(i,4)*c4+pz(i,5)*c5
401   continue
      return
      end subroutine fixtwo(k,px,py,pz,norm)
      integer k
      real norm(4),statwo(4),newtwo(4),tani(4),dist,mag
      real px(80,6),py(80,6),pz(80,6)
        statwo(1)=px(k,2)-px(k,1)
        statwo(2)=py(k,2)-py(k,1)
        statwo(3)=pz(k,2)-pz(k,1)
        dist=statwo(1)*statwo(1)+statwo(2)*statwo(2)
     *       +statwo(3)*statwo(3)
        dist=sqrt(dist)
        call cross(statwo,norm,tani)
        call cross(norm,tani,newtwo)
        mag=newtwo(1)*newtwo(1)+newtwo(2)*newtwo(2)
     *       +newtwo(3)*newtwo(3)
        mag=sqrt(mag)
        px(k,2)=px(k,1)+newtwo(1)*dist/mag
        py(k,2)=py(k,1)+newtwo(2)*dist/mag
        pz(k,2)=pz(k,1)+newtwo(3)*dist/mag
      return
      end
```

```fortran
      subroutine calc_ptsa(k,numq,px,py,pz,x,y,z)
      integer k,numq
      real px(80,6),py(80,6),pz(80,6),x(80,30)
      real y(80,30),z(80,30),inc
      real a,t,c1,c2,c3,c4,c5
      inc = 1.0/(numq-1.0)
      do 401 j = 1,numq
       t = (j-1.0)*inc
       a = 1.0-t
       c1 = a*a*a*a
       c2 = a*a*a*t*4
       c3 = 6.0*t*t*a*a
       c4 = 4.0*t*t*t*a
       c5 = t*t*t*t
       x(k,j) = px(k,1)*c1 + px(k,2)*c2 + px(k,3)*c3 +
     *px(k,4)*c4 + px(k,5)*c5
       y(k,j) = py(k,1)*c1 + py(k,2)*c2 + py(k,3)*c3 +
     *py(k,4)*c4 + py(k,5)*c5
       z(k,j) = pz(k,1)*c1 + pz(k,2)*c2 + pz(k,3)*c3 +
     *pz(k,4)*c4 + pz(k,5)*c5
 401  continue
      return
      end subroutine pattern(initial_param,initial_delta,num_params,
     *          target,accept,good_guess,p,n,iflag)
C Pattern search on 2 varaibles based on base-point Golden
C section search
      integer  stay_at_a,criterion,num_params,i,n,count,iflag
      real     delta(4),test_point(4),base_point(4)
      real     base_point_new(4),initial_param(4),initial_delta(4)
      real     merita,meritb,accept,good_guess(4),target(4)
      real p(3,8,8),s,t,minval
      call merit(p,initial_param,num_params,n,target,merita)
      do 210 i = 1,num_params
       test_point(i) = initial_param(i)
       base_point(i) = initial_param(i)
 210  base_point_new(i) = initial_param(i)
      count = 0
      stay_at_a = 0
 270  continue
      criterion = 0
 280  continue
      stay_at_a = 0
      count = count + 1
      if (count.gt.50) then
       print *, 'count',count,' out of range'
       goto 290
      endif
```

```
      do 220 i=1,num_params
        test_point(i) = test_point(i) + initial_delta(i)
        if (test_point(i).gt.1.0) test_point(i) = 1.0
        call merit(p,test_point,num_params,n,target,meritb)
      if (iflag.eq.1) then
      endif
        test_point(i) = test_point(i)-initial_delta(i)
        if (test_point(i).lt.0.0) test_point(i) = 0.0
        call minvalr(merita,meritb,minval)
        if (minval.lt.merita) then
          delta(i) = initial_delta(i)
      if (iflag.eq.1) then
      endif
          test_point(i) = test_point(i) + delta(i)
          merita = minval
        else
          delta(i) = 0.0
          test_point(i) = test_point(i)-initial_delta(i)
          if (test_point(i).lt.0.0) test_point(i) = 0.0
          call merit(p,test_point,num_params,n,target,meritb)
      if (iflag.eq.1) then
      endif
          test_point(i) = test_point(i) + initial_delta(i)
          if (test_point(i).gt.1.0) test_point(i) = 1.0
          call minvalr(merita,meritb,minval)
      if (iflag.eq.1) then
      endif
          endif
        if (delta(i).eq.0.0) then
          if (minval.lt.merita) then
            delta(i) = -initial_delta(i)
      if (iflag.eq.1) then
      endif
            test_point(i) = test_point(i) + delta(i)
            merita = minval
          else
      if (iflag.eq.1) then
      endif
            stay_at_a = stay_at_a + 1
      if (iflag.eq.1) then
      endif
          endif
        endif
220   continue
      do 230 i=1,num_params
        base_point(i) = base_point_new(i)
        base_point_new(i) = test_point(i)
        if (base_point_new(i).gt.1.0) base_point_new(i) = 1.0
```

```
      if (base_point_new(i).lt.0.0) base_point_new(i) = 0.0
      test_point(i) = base_point(i) + 2.0*(base_point_new(i)-
   *  base_point(i))
      if (test_point(i).gt.1.0) test_point(i) = 1.0
      if (test_point(i).lt.0.0) test_point(i) = 0.0
230   continue
      call merit(p,base_point_new,num_params,n,target,meritb)
      if (iflag.eq.1) then
      endif
      call merit(p,test_point,num_params,n,target,merita)
      if (iflag.eq.1) then
      endif
      call minvalr(merita,meritb,minval)
      if (meritb.gt.merita) goto 280
      do 240 i = 1,num_params
240   test_point(i) = base_point_new(i)
      merita = meritb
      if (iflag.eq.1) then
      endif
      if (stay_at_a.lt.num_params) goto 280
      if (iflag.eq.1) then
      endif
      do 250 i = 1,num_params
      if (initial_delta(i).gt.accept) criterion = criterion + 1
250   initial_delta(i) = initial_delta(i)/2.0
      if (criterion.gt.0) goto 270
290   continue
      do 260 i = 1,num_params
260   good_guess(i) = test_point(i)
      return
      end subroutine merit(p,params,num_params,n,target,meritt)
C  returns merit
      integer n,num_params
      real    a,b,p(3,8,8),params(4),target(4),meritt
      real q(4)
      s = params(1)
      t = params(2)
      if (iflag.eq.1) then
      endif
      call surf(p,s,t,q,n)
      if (iflag.eq.1) then
      endif
      a = (q(1)-target(1))*(q(1)-target(1))
      b = (q(2)-target(2))*(q(2)-target(2))
      meritt = sqrt(a) + sqrt(b)
      return
      end
```

```
      subroutine minvalr(value1,value2,minval)
C     return minimum of two real numbers
      real value1,value2,minval
      if (value1.gt.value2) then
        minval=value2
      else
        minval=value1
      endif
      if (iflag.eq.1) then
      endif
      return
      end
```

What is claimed is:

1. A method for designing an integrated inlet duct for efficient transmission of a substantially cavitation free fluid flow, said inlet duct for mounting in a marine vehicle, said method comprising the steps of:

(a) determining a surface geometry for said integrated inlet duct within specified hydrodynamic design constraints, said inlet duct having an inlet opening defining an inlet plane, an inlet exit defining an exit plane, a centrally located reference axis extending from said inlet plane to said exit plane, and a smooth continuous surface extending from a periphery of said inlet opening to a periphery of said inlet exit, wherein said surface geometry is represented by a series of fifth-order Bezier cross-link curves, each of said Bezier cross-link curves being explicitly and uniquely defined by a set of five associated control points said five associated control points being independent variables of a Bezier basis function, wherein a series of said sets defines said surface geometry;

(b) generating a panel representation of said surface geometry, said panel representation representing said smooth continuous surface of said inlet duct, said surface establishing pressure and velocity distributions of said flow within said inlet duct;

(c) calculating said pressure and velocity distributions of said flow within said inlet duct, said calculating including a predetermined suction effect;

(d) evaluating said surface geometry based on said specified hydrodynamic design constraints;

(e) repeating steps (a) through (d) for subsequent iterations of said surface geometry until said specified hydrodynamic design constraints are satisfactorily met at a predetermined design condition;

(f) evaluating a resulting surface geometry at off-design conditions; and (g) repeating step (a) through (d) for subsequent iterations of said surface geometry until said specified hydrodynamic design constraints are satisfactorily met at off-design conditions.

2. A method as in claim 1, further comprising the steps of:

(h) performing a geometric refinement to a fillet region, said fillet region defining a region of high curvature in said inlet duct;

(i) generating a panel representation of a resulting surface geometry;

(j) calculating said pressure and velocity distributions of said flow within said inlet duct, said calculating including a predetermined suction effect;

(k) evaluating said surface geometry based on said specified hydrodynamic design constraints, said evaluation being performed at desired operating conditions; and (l) repeating steps (h) through (k) for subsequent iterations of said surface geometry until said specified hydrodynamic design constraints are optimally met.

3. A method as in claim 2, wherein said hydrodynamic design constraints include minimizing thrust deduction fraction, requiring absolute pressure to remain above a vapor pressure of said fluid at all points on said surface, and optimizing pressure gradients within said inlet duct to prevent flow separation.

4. A method as in claim 2, wherein during step (a) geometric design parameters are imposed on said surface geometry, said geometric design parameters including requiring a length of said inlet duct from said opening to said exit to be less than or equal to about a diameter of said exit, and requiring an inclination angle of said inlet duct to be between about 45° and 75° relative to a plane defined by said opening.

5. A method as in claim 2, wherein step (b) further includes generating a panel representation of a patch of said marine vehicle, said patch being adjacent said inlet duct and surrounding said opening, and wherein step (c) further includes calculating pressure and velocity distributions of the flow over said patch.

6. A method as in claim 1, further comprising the following steps being performed before step (a):
generating a panel representation of said marine vehicle in a barehull configuration; and
analyzing flow over said marine vehicle at a desired operating condition to determine a location for said inlet opening.

7. A method as in claim 1, wherein step (a) comprises the following steps:
determining a shape and area of said inlet opening, said inlet opening having an aspect ratio of a major to a minor dimension associated therewith, said inlet opening being located in said inlet plane;
determining an inlet duct inclination angle, said inclination angle defined by said centrally located reference axis wherein said inclination angle is an angle between said reference axis and said inlet plane;
determining a length of said inlet duct from said inlet opening to said inlet exit;
defining stations 1 through 5, wherein said stations 1 through 5 determine the placement of said series of five associated control points, each of said stations 1 through 5 being nominally located in a plane;
distributing a predetermined number X of peripherally spaced control points around each of said stations 1 through 5, said control points providing X sets of five associated control points;
generating a series of X Bezier curves; and
interpolating a predetermined number of points along each of said Bezier curves, said points serving as grid points for said panel representation.

8. A method as in claim 7, wherein said defining step includes:
defining said station 1 to coincide with said inlet opening, wherein a plane of station 1 nominally coincides with said inlet plane, wherein an aspect ratio of station 1 is equal to said aspect ratio of said inlet opening, and further wherein said control points on said station 1 are located around a periphery of said inlet opening;
defining said station 5 to coincide with said inlet exits wherein a plane of station 5 coincides with said exit plane, wherein said inlet exit is a circle and is arranged perpendicularly to said reference axis and concentrically therewith, and further wherein said control points on said station 5 are located around a periphery of said inlet exit;
defining said station 4 by specifying a distance between said stations 4 and 5 and a tangency condition of said Bezier curve at said station 5, wherein said station 4 is arranged perpendicularly with said reference axis, and further wherein said stations 4 and 5 define a cylinder arranged concentrically with said reference axis;
defining said station 2 to be in said plane of station 1, wherein an aspect ratio of said station 2 is equal to said aspect ratio of station 1, and further wherein said station 2 is circumscribed by said station 1;
defining said station 3 to be nominally perpendicular with said reference axis, wherein said station 3 is determined such that a resulting Bezier curve is a smooth continuous curve having a smooth transition between a portion of said curve defined by said control points 1 and 2 and a portion of said curve defined by said control points 4 and 5.

9. A method as in claim 2, wherein step (a) comprises the following steps:
determining a shape and area of said inlet opening, said inlet opening having an aspect ratio of a major to a minor dimension associated therewith, said inlet opening being located in said inlet plane;
determining an inlet duct inclination angle, said inclination angle defined by said centrally located reference axis wherein said inclination angle is an angle between said reference axis and said inlet plane;
determining a length of said inlet duct from said inlet opening to said inlet exit;
defining stations 1 through 5, wherein said stations 1 through 5 determine the placement of said series of five associated control points, each of said stations 1 through 5 being nominally located in a plane;
distributing a predetermined number X of peripherally spaced control points around each of said stations 1 through 5, said control points providing X sets of five associated control points;
generating a series of X Bezier curves; and
interpolating a predetermined number of points along each of said Bezier curves, said points serving as grid points for said panel representation.

10. A method as in claim 9, wherein said defining step includes:
defining said station 1 to coincide with said inlet opening, wherein a plane of station 1 nominally coincides with said inlet plane, wherein an aspect ratio of station 1 is equal to said aspect ratio of said inlet opening, and further wherein said control points on said station 1 are located around a periphery of said inlet opening;
defining said station 5 to coincide with said inlet exit, wherein a plane of station 5 coincides with said exit plane, wherein said inlet exit is a circle and is arranged perpendicularly to said reference axis and concentrically therewith, and further wherein said control points on said station 5 are located around a periphery of said inlet exit;
defining said station 4 by specifying a distance between said stations 4 and 5 and a tangency condition of said Bezier curve at said station 5, wherein said station 4 is arranged perpendicularly with said reference axis, and further wherein said stations 4 and 5 define a cylinder arranged concentrically with said reference axis;
defining said station 2 to be in said plane of station 1, wherein an aspect ratio of said station 2 is equal to said aspect ratio of station 1, and further wherein said station 2 is circumscribed by said station 1;
defining said station 3 to be nominally perpendicular with said reference axis, wherein said station 3 is determined such that a resulting Bezier curve is a smooth continuous curve having a smooth transition between a portion of said curve defined by said control points 1 and 2 and a portion of said curve defined by said control points 4 and 5.

11. An inlet for providing efficient transmission of a substantially cavitation free fluid flow to a marine vehicle, said inlet comprising:
an integrated inlet duct having an internal contour designed by the method of claim 2, said inlet duct extending between an initial end and a terminal end, said initial end circumscribing an inlet opening and defining an inlet plane, said terminal end circumscribing an inlet exit and defining an exit plane, said inlet duct having a centrally located reference axis extending from said inlet plane to said exit plane wherein said reference axis defines an inclination angle relative to said inlet plane, said inclination angle being between about 45° and about 75°;

12. An inlet as in claim 11, wherein a length of said inlet duct from said inlet opening to said inlet exit is less than or equal to a diameter of said inlet exit.

13. An inlet as in claim 12, wherein said inlet opening has a curvilinear cross-section at said inlet plane.

14. An inlet as in claim 13, wherein said curvilinear transverse cross-section is chosen from the group consisting of a circle, an ellipse and an oval.

15. An inlet as in claim 13, wherein said exit plane is perpendicular to said reference axis, and further wherein said inlet exit has a circular cross-section at said exit plane, said inlet exit being arranged concentrically with said reference axis.

16. An inlet as in claim 15, wherein said internal contour of said inlet duct defines a Bezier surface, said Bezier surface being defined by a series of fifth order Bezier cross-link curves.

* * * * *